US012776979B2

(12) United States Patent
Miura et al.

(10) Patent No.: US 12,776,979 B2
(45) **Date of Patent: *Oct. 27, 2026**

(54) DATA PROCESSING SYSTEM AND DATA PROCESSING METHOD

(71) Applicant: NTT, Inc., Tokyo (JP)

(72) Inventors: Naoki Miura, Tokyo (JP); Takeshi Sakamoto, Tokyo (JP); Yuki Arikawa, Tokyo (JP); Tsuyoshi Ito, Tokyo (JP); Kenji Tanaka, Tokyo (JP); Masaru Katayama, Tokyo (JP); Yuta Ukon, Tokyo (JP)

(73) Assignee: NTT, INC., Tokyo (JP)

( * ) Notice: Subject to any disclaimer, the term of this patent is extended or adjusted under 35 U.S.C. 154(b) by 187 days.

This patent is subject to a terminal disclaimer.

(21) Appl. No.: 18/705,398

(22) PCT Filed: Nov. 8, 2022

(86) PCT No.: PCT/JP2022/041554

§ 371 (c)(1),
(2) Date: Nov. 26, 2024

(87) PCT Pub. No.: WO2023/085266

PCT Pub. Date: May 19, 2023

(65) Prior Publication Data

US 2025/0097137 A1 Mar. 20, 2025

(30) Foreign Application Priority Data

Nov. 12, 2021 (JP) ................................ 2021-184725

(51) Int. Cl.
*H04L 45/037* (2022.01)
*H04L 47/24* (2022.01)

(52) U.S. Cl.
CPC ............ *H04L 45/037* (2022.05); *H04L 47/24* (2013.01)

(58) Field of Classification Search
None
See application file for complete search history.

(56) References Cited

U.S. PATENT DOCUMENTS 10,439,944 B2 * 10/2019 Backman ................ H04L 67/63
10,891,246 B2 1/2021 Ukon et al.

(Continued)

FOREIGN PATENT DOCUMENTS

JP 2016225877 A 12/2016
WO 2018159677 A1 9/2018

OTHER PUBLICATIONS

Halpern, J. et al., "Service Function Chaining (SFC) Architecture," Internet Engineering Task Force (IETF), Oct. 2015, 32 pages. As discussed in the specification.

(Continued)

*Primary Examiner* — Fadi Haj Said
(74) *Attorney, Agent, or Firm* — Slater Matsil, LLP

(57) ABSTRACT

A user management apparatus adds a tag in which route information is described to a packet received from a user and transmits the packet to a data transfer device. The data transfer device transfers the packet to one of data processing devices under control and other data transfer devices based on the route information included in the received packet. The data processing device performs processing of a service function for data included in the received packet. A communication management apparatus calculates a route of a service chain necessary for implementing the service requested by the user and transmits route information to the user management apparatus.

11 Claims, 20 Drawing Sheets

(56) References Cited

U.S. PATENT DOCUMENTS

| | | | | |
|---|---|---|---|---|
| 11,296,935 | B2 * | 4/2022 | Nolan | H04L 67/104 |
| 2012/0281540 | A1 * | 11/2012 | Khan | H04L 45/308 370/328 |
| 2018/0262431 | A1 | 9/2018 | Zhang et al. | |

OTHER PUBLICATIONS

Ukon, et al., "Real-Time Image Processing Based on Service Function Chaining Using CPU-FPGA Architecture," IEICE Trans. Commun., vol. EI03-B. No. 1, Jan. 2020, 11-19 pages. As discussed in the specification.
Mochizuki et al., "Service Chaining Method to Satisfy the Carrier Requirements for Network Functions Virtualization," IEICE, Technical Report vol. 114 No. 206, IEICE The Institute of Electronics, Information and Communication Engineers, Sep. 30, 2014, p. 113 to 118.
Takaya et al., "Service Chaining Technology," Explanation, Journal of the Institute of Electronics, Information and Communication Engineers, vol. 99, No. 6 The Journal of the Institute of Electronics, Information and Co , The Institute of Electronics, Information and Communication Engineers, Denshi-Joho-Tsushin, Jun. 1, 2016, p. 536 to 542.

* cited by examiner

DATA PROCESSING SYSTEM AND DATA PROCESSING METHOD

CROSS-REFERENCE TO RELATED APPLICATIONS

This application is a national phase entry of PCT Application No. PCT/JP2022/041554, filed on Nov. 8, 2022, which claims priority to Japanese Patent Application No. 2021-184725, filed on Nov. 12, 2021, which applications are hereby incorporated herein by reference.

TECHNICAL FIELD

The present invention relates to a data processing system that provides a service to a user by a service function chaining technique, and a data processing method.

BACKGROUND

To flexibly provide an end-to-end service, Service Function Chaining (SFC) has been examined (non-patent literature 1). SFC is a technique of freely combining Service Functions (SF) scattered on a network, and it is possible to provide an optimum service for each user by using the SFC.

In a network using the SFC, as shown in FIG. 17, a classifier 10 at the inlet adds a tag to a packet 11 on a user basis, and a Service Function Forwarder (SFF) 12 transfers the packet 11 to an appropriate SF based on the tag. In FIG. 17, reference numeral 13 denotes a server that implements an SF; and 14, a service chain in which SFs provided to a user are connected in a row. Using the SFC, a user can construct a unique service by combining SFs suitable for his/her purpose.

The SFC has been developed mainly for a network service. SFs are assumed to be firewall, Deep Packet Inspection (DPI), load balancing, and the like. Since these functions complete processing for each packet, users and packet orders need not be taken into consideration.

The SFC is a technique advantageous for a cloud service as well. For example, non-patent literature 2 discloses, as an image processing service using the SFC, a video monitoring service that combines two types of image processing functions. However, the technique disclosed in non-patent literature 2 does not assume a situation where a plurality of users use a network, and a problem may occur if each user operates a service.

A user who uses a cloud service divides data into a plurality of packets (data packets) and sends these to the server 13, generally as shown in FIG. 18. Reference numeral 11A in FIG. 18 denotes a data packet of a user A; and 11B, a data packet of a user B. Also, reference numeral 14A denotes a service chain in which SFs to be provided to the user A are connected in a row; and 14B, a service chain in which SFs to be provided to the user B are connected in a row.

The conventional SFC does not take users and packet orders into consideration. For this reason, in a cloud service using the conventional SFC, the data packets 11A and 11B of the different users may successively arrive at the server 13. At this time, if the data packets 11A and 11B of the different users mix, the server 13 cannot guarantee an appropriate result. An X mark in FIG. 18 indicates that processing cannot be performed because of the mixture of the data packets 11A and 11B.

If the data packets are distributed in the server 13 for each user, a calculation resource needs to be spared for this. Also, a memory resource for holding data packets is necessary. If the users are managed in the server 13, resources that can be assigned to SFs decrease. Furthermore, since a user management function is needed in each server 13, many resources are consumed in the whole system. Hence, the SF implementation efficiency is low with respect to the system scale. Also usable is a method of assigning different SFs instead of sharing SFs among service chains. However, since the standby time is long, the SF use efficiency is low.

RELATED ART LITERATURE

Non-Patent Literature

Non-Patent Literature 1: RFC 7665-Service Function Chaining (SFC) Architecture, Internet Engineering Task Force (IETF), October 2015, <https://datatracker.ietf.org/doc/html/rfc7665>

Non-Patent Literature 2: Yuta UKON, Koji YAMAZAKI, Koyo NITTA, "Real-Time Image Processing Based on Service Function Chaining Using CPU-FPGA Architecture", IEICE Transactions on Communications, Vol. E103-B, No. 1, pp. 11-19, 2020, <https://search.ieice-.org/bin/summary.php?id=e103-b_1_11>

SUMMARY

The present invention has been made to solve the above-described problem, and has as its object to provide a data processing system capable of avoiding collision of data in data processing devices and suppressing lowering of service function use efficiency even under use by a plurality of users, and a data processing method.

A data processing system according to embodiments of the present invention comprises a user management apparatus configured to perform management of information of a user who applies for use of a service, and transfer control of a packet received from the user; a data processing device configured to perform data processing of a service function for data included in the received packet; one or a plurality of data transfer devices having one or a plurality of data processing devices under control, a communication management apparatus configured to calculate a route of a service chain necessary for implementing the service requested by the user and transmit route information to the user management apparatus, and update a routing table registered in the data transfer device on the calculated route based on a result of route calculation; and an external transmission apparatus configured to return, to the user, the packet that has undergone all data processes of the service chain, wherein the user management apparatus is configured to add, to the packet received from the user, a tag in which the route information is described, and transmit the packet to the data transfer device, the data transfer device is configured to transfer the packet to one of the data processing devices under control and other data transfer devices based on the route information included in the tag added to the received packet and the routing table, and the data processing device returns the packet that has underdone the data processing to the data transfer device of a transmission source.

According to embodiments of the present invention, a user management apparatus, a data processing device, a data transfer device, a communication management apparatus, and an external transmission apparatus are provided, thereby managing data for each user using the user management apparatus and performing control to flow only data for one user per service chain. In embodiments of the present invention, it is possible to avoid collision of data in the data processing device, and a plurality of users can use one data processing device (service function). Hence, lowering of service function use efficiency can be suppressed even under use by a plurality of users.

DETAILED DESCRIPTION OF ILLUSTRATIVE EMBODIMENTS

Figure 1:
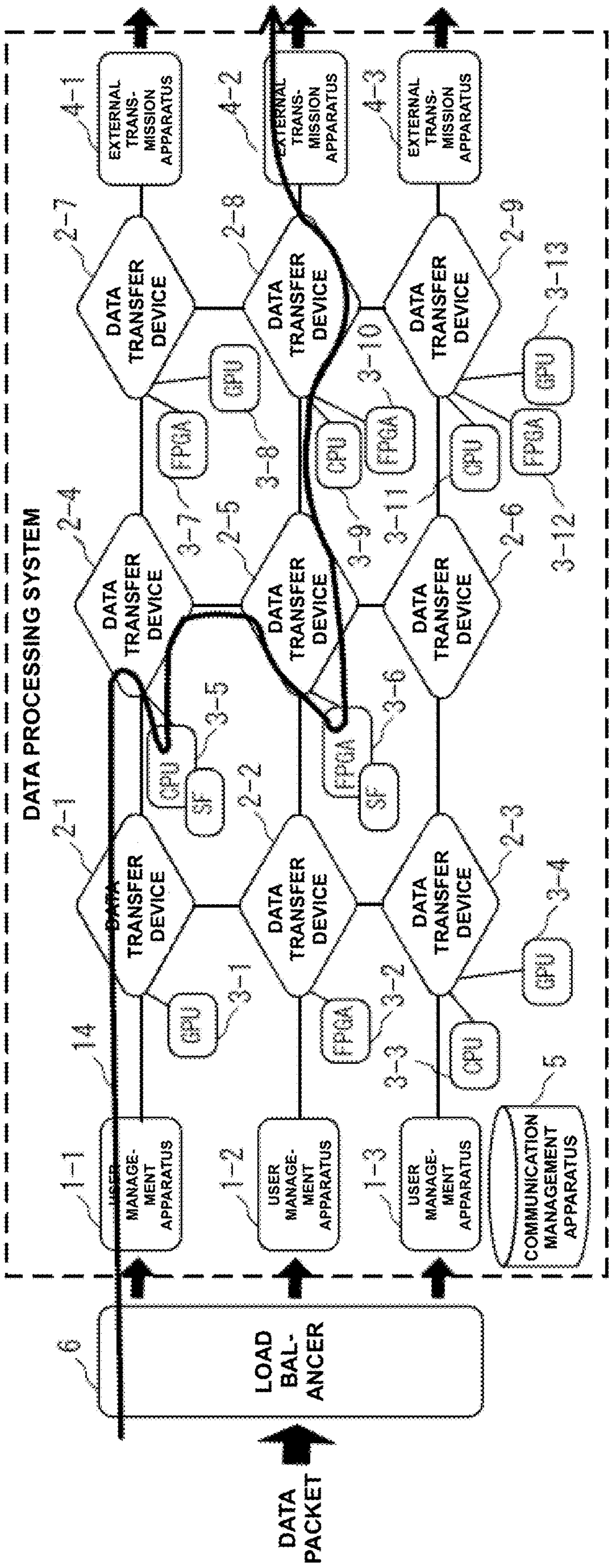
FIG. 1 is a block diagram showing the configuration of a data processing system according to the embodiment of the present invention.

An embodiment of the present invention will now be described with reference to the accompanying drawings. FIG. 1 is a block diagram showing the configuration of a data processing system according to the embodiment of the present invention. The data processing system includes user management apparatuses 1-1 to 1-3 each of which manages the information of a user who has applied use of a service and controls transfer of a packet received from the user, one or a plurality of data transfer devices 2-1 to 2-9 each of which transfers packets, data processing devices 3-1 to 3-13 each of which performs data processing in an SF for data included in a received packet, and external transmission apparatuses 4-1 to 4-3 each of which returns a packet that has undergone all data processes of a service chain to a user. The data processing system also includes a communication management apparatus 5 that calculates the route of a service chain necessary for implementing a service requested by each user, transmits route information to the user management apparatuses 1-1 to 1-3, and updates, based on the result of route calculation, routing tables registered in the data transfer devices 2-1 to 2-9 on the calculated route.

As the data processing devices 3-1 to 3-13, a Central Processing Unit (CPU), a Field-Programmable Gate Array (FPGA), a Graphics Processing Units (GPU), an Application Specific Integrated Circuit (ASIC), and the like can be used.

In this embodiment, SFs implemented by the data processing devices 3-1 to 3-13 are combined, thereby providing a service customized for each user. More specifically, communication is performed between the data transfer devices 2-1 to 2-9, and a data packet sent from a user is transferred to an appropriate SF. If data processing in the SF is completed, the data packet is further transferred to another SF, and data processing is performed. Thus, in this embodiment, a service according to the purpose of a user is provided by changing the processing contents for each user.

Figure 17:
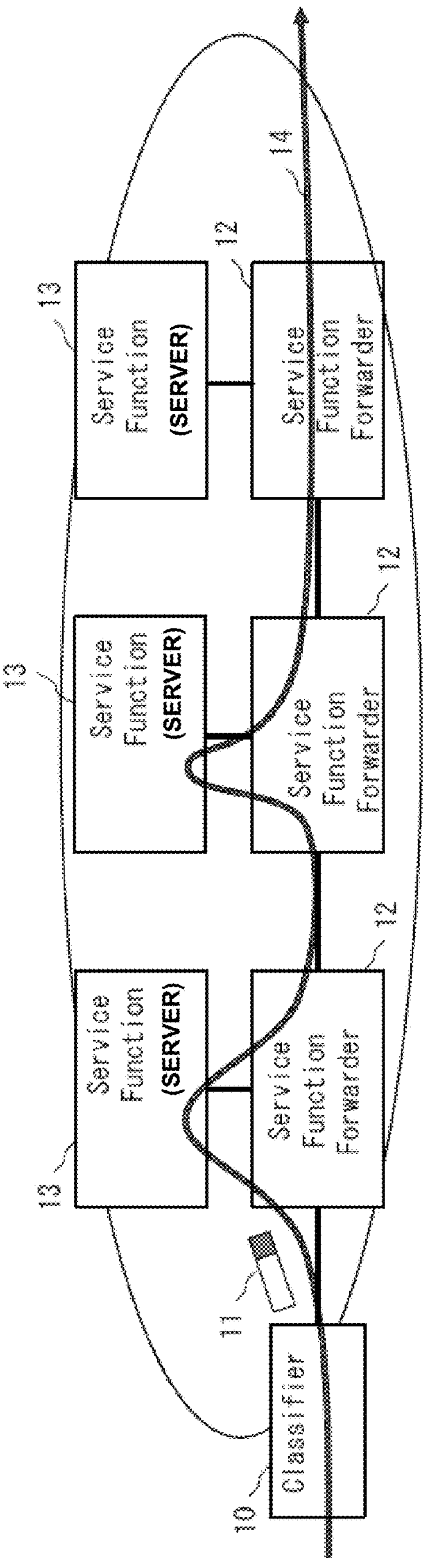
FIG. 17 is a view for explaining a conventional service function chaining technique.
Figure 18:
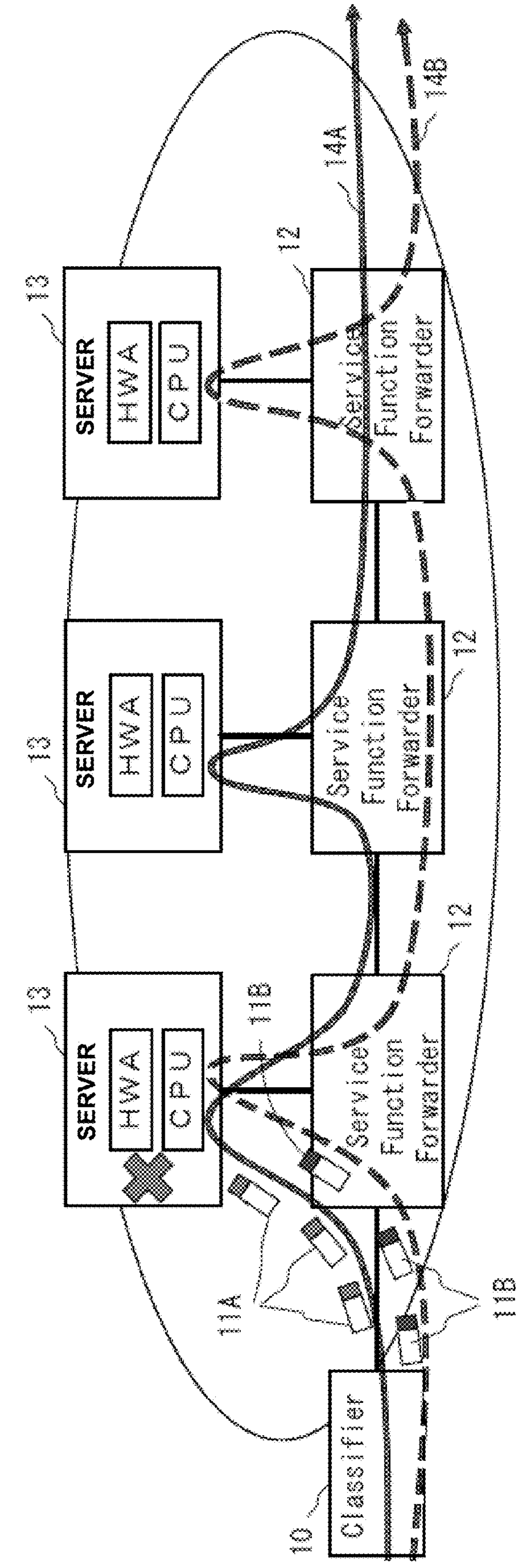
FIG. 18 is a view for explaining a problem of the conventional service function chaining technique.

A communication path through which a data packet passes is called a service chain. As in FIG. 17, reference numeral 14 in FIG. 1 denotes a service chain. If a plurality of users simultaneously use the service chain, data collide in the SFs, and an appropriate result cannot be guaranteed. Hence, in this embodiment, data packets are managed in the user management apparatuses 1-1 to 1-3 at the inlet of the data processing system, thereby controlling such that only one user can use the service chain.

Also, the user management apparatuses 1-1 to 1-3 each add a tag to each data packet. In the tag, the route information of the service chain is described. The data transfer devices 2-1 to 2-9 perform routing of a data packet based on the tag. Detailed examples of the tag are a Network Service Header (NSH), a Multi-Protocol Label Switching (MPLS) header, and a Segment Routing over IPv6 (SRv6). A unique header may be defined.

In routing using a Media Access Control (MAC) address or an Internet Protocol (IP) address, a large routing table needs to be provided in each of the data transfer devices 2-1 to 2-9. On the other hand, in routing using a tag, as in this embodiment, the scale of the routing table is made small by causing a data packet to include route information, thereby decreasing the calculation resource or memory resource necessary for routing.

The external transmission apparatuses 4-1 to 4-3 each add destination information to the data packet that has undergone all data processes, and return it to the user. The reason why the external transmission apparatuses 4-1 to 4-3 are necessary is that protocols used in and outside the data processing system are different. As communication outside the data processing system, TCP/IP is used as the world standard. On the other hand, in the data processing system, packet communication using a tag is performed due to the above-described reason. Hence, to absorb the difference of the protocols in and outside the data processing system, the external transmission apparatuses 4-1 to 4-3 are used.

Figure 2:
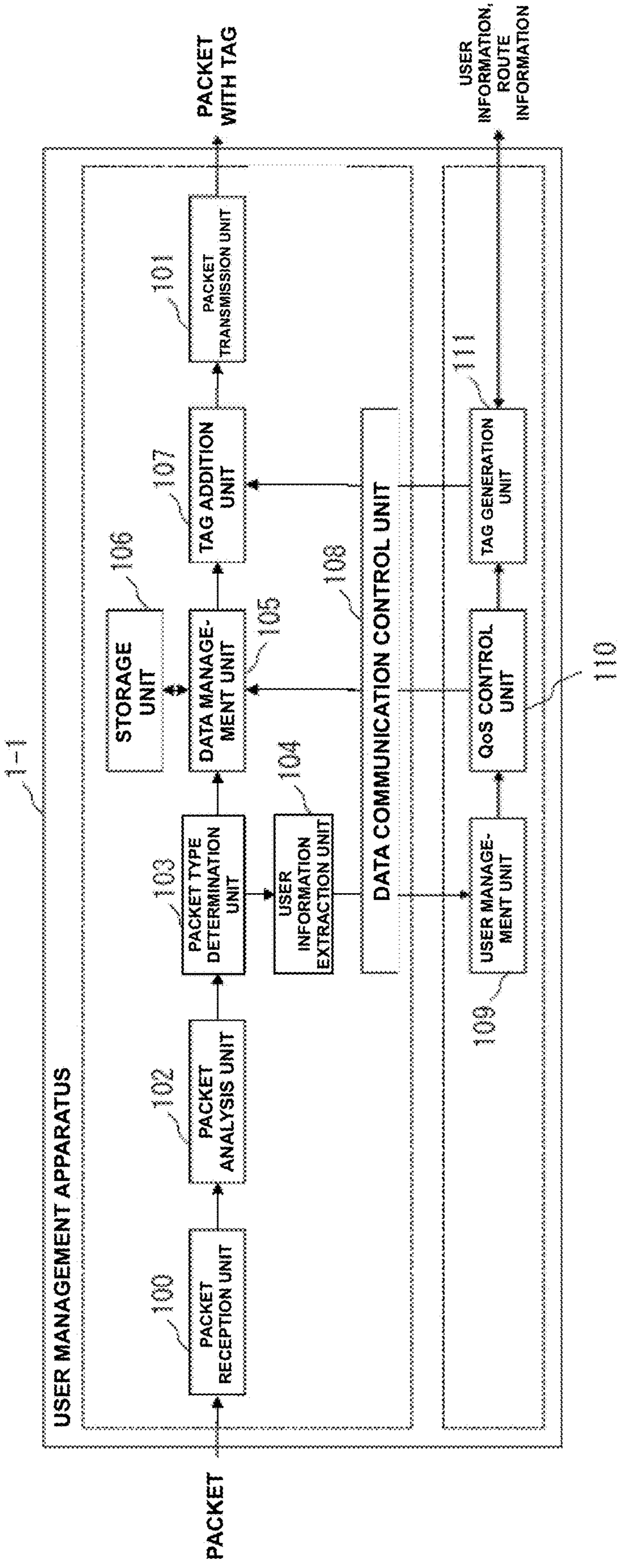
FIG. 2 is a block diagram showing the configuration of a user management apparatus according to the embodiment of the present invention.

FIG. 2 is a block diagram showing the configuration of the user management apparatus 1-1. The user management apparatus 1-1 includes a packet reception unit 100, a packet transmission unit 101, a packet analysis unit 102 that analyzes a received packet, a packet type determination unit 103 that determines the type of the received packet, a user information extraction unit 104 that extracts user information from the packet, a data management unit 105 that transfers the packet received from the user to a tag addition unit 107 at a timing according to a priority, a storage unit 106 configured to temporarily store the packet received from the user, the tag addition unit 107 that adds a tag to the packet received from the user, a data communication control unit 108, a user management unit 109 that manages the information of a user who has applied use of a service, issues a user ID, and notifies the user of the issued user ID, a Quality of Service (QOS) control unit 110 that decides the priority of transfer of a packet for each user based on the information of the user managed by the user management unit 109, and a tag generation unit 111 that generates a tag that describes route information received from the communication management apparatus 5.

Figure 3:
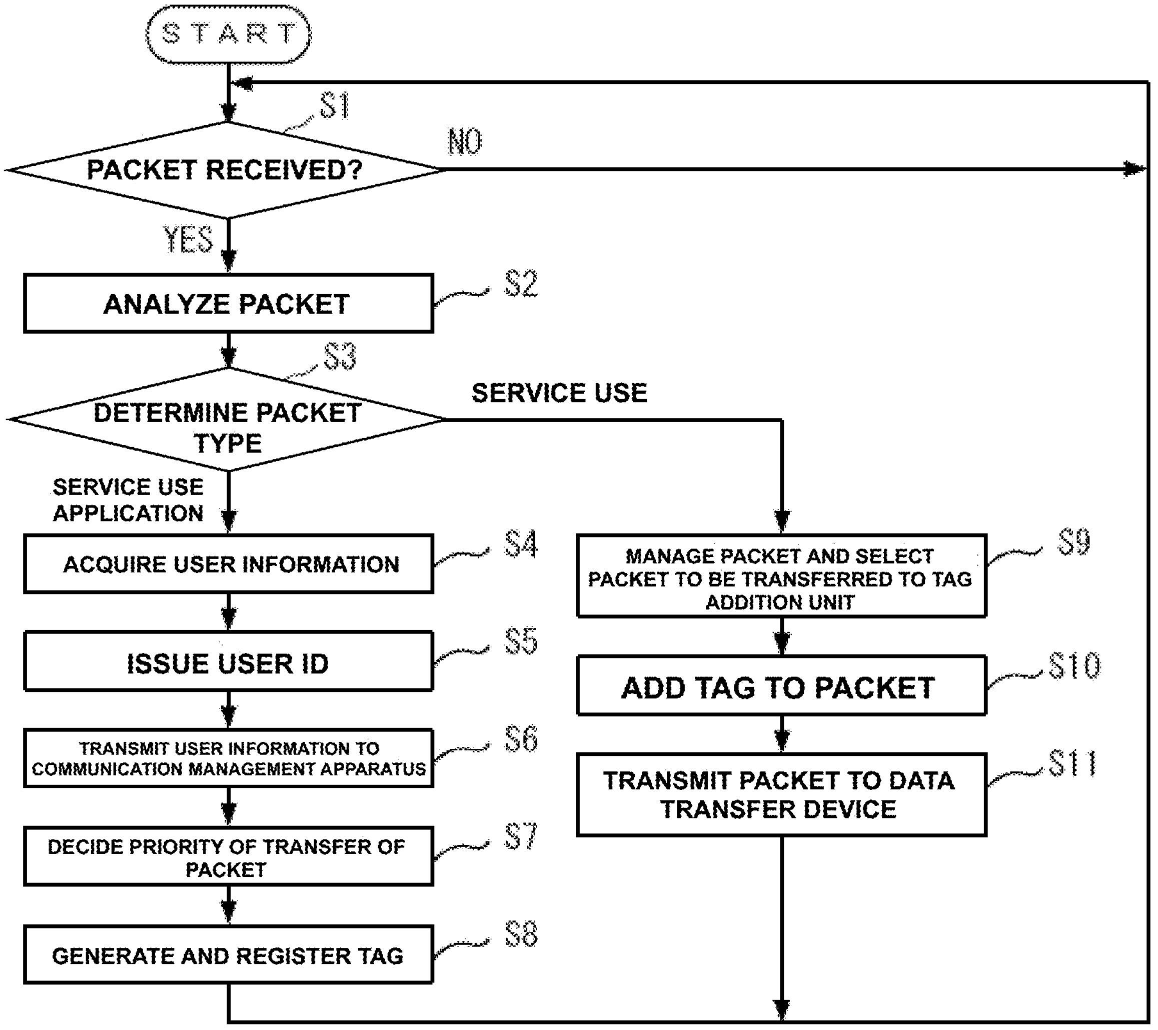
FIG. 3 is a flowchart for explaining the operation of the user management apparatus according to the embodiment of the present invention.

FIG. 3 is a flowchart for explaining the operation of the user management apparatus 1-1. If the packet reception unit 100 of the user management apparatus 1-1 receives a packet (step S1 in FIG. 3), first, the packet analysis unit 102 analyzes the packet (step S2 in FIG. 3).

The packet type determination unit 103 determines the packet type based on the analysis result by the packet analysis unit 102 (step S3 in FIG. 3). Packet types include "service use application" and "service use".

The packet type determination unit 103 sends a packet whose packet type is "service use application" to the user information extraction unit 104, and sends a packet whose packet type is "service use" to the data management unit 105.

The user information extraction unit 104 acquires user information (an ID address, a port number, a contract number, service information, a priority, and the like) described in the packet received from the packet type determination unit 103 (step S4 in FIG. 3). The user information extraction unit 104 sends the acquired user information to the user management unit 109.

The user management unit 109 manages the user information received from the user information extraction unit 104. The user management unit 109 issues, to the user, a user ID needed to use the service (step S5 in FIG. 3), and transfers the user information to the communication management apparatus 5 together with the user ID (step S6 in FIG. 3).

The QoS control unit 110 decides the priority of packet transfer for each user based the priority or the information of the service requested by the user, and registers the priority information (QOS information) in the data management unit 105 (step S7 in FIG. 3).

The tag generation unit 111 receives the route information from the communication management apparatus 5, and generates a tag in which the route information is described. Then, the tag generation unit 111 associates the generated tag with the user ID issued by the user management unit 109 and registers these in the tag addition unit 107 (step S8 in FIG. 3).

The data management unit 105 receives the packet determined as "service use" by the packet type determination unit 103, distributes the received packet on a user basis, and temporarily stores it in the storage unit 106. The data management unit 105 then extracts the packet of a specific user for each service chain from the storage unit 106 based on the information of the priority registered by the QoS control unit 110 and transfers it to the tag addition unit 107 (step S9 in FIG. 3).

If a user ID is issued to a user, the user ID is added by the user to a packet whose packet type is "service use", as will be described later.

The tag addition unit 107 adds, to the received packet, a tag corresponding to the user ID added to the packet received from the data management unit 105 among the tags registered by the tag generation unit 111, and outputs the packet with the tag to the packet transmission unit 101 (step S10 in FIG. 3).

The packet transmission unit 101 transmits the packet output from the tag addition unit 107 to the closest one of the data transfer devices 2-1 to 2-9 (step S11 in FIG. 3).

As described above, detailed examples of the tag are an NSH and an MPLS header. Also, a unique header may be defined. In place of the tag, a MAC address or an IP address can also be used. However, in a method using a MAC address or an IP address, the data transfer devices 2-1 to 2-9 need to have a large-scale routing table, and more calculation resources and memory resources are consumed as compared to a method using a tag.

Note that in the example shown in FIGS. 2 and 3, a description has been made using the user management apparatus 1-1 as an example, and the configuration and operation of the user management apparatuses 1-2 and 1-3 are the same as the user management apparatus 1-1.

Figure 4:
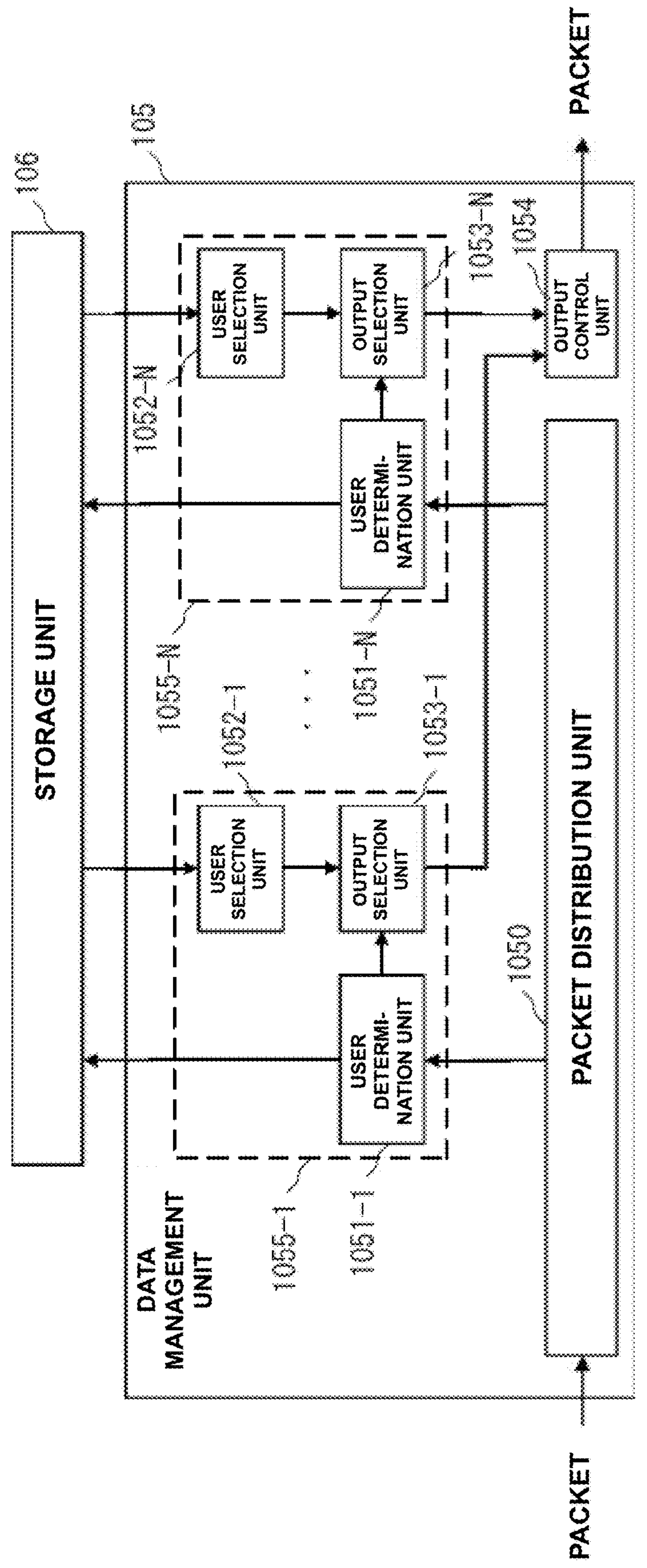
FIG. 4 is a block diagram showing the configuration of the data management unit of the user management apparatus according to the embodiment of the present invention.

FIG. 4 is a block diagram showing the configuration of the data management unit 105 of each of the user management apparatuses 1-1 to 1-3. The data management unit 105 is formed by a packet distribution unit 1050, one or a plurality of user determination units 1051-1 to 1051-N(N is an integer of 1 or more), one or a plurality of user selection units 1052-1 to 1052-N, one or a plurality of output selection units 1053-1 to 1053-N, and an output control unit 1054.

The user determination unit 1051-1, the user selection unit 1052-1, and the output selection unit 1053-1 form a memory controller 1055-1. Similarly, the user determination unit 1051-N, the user selection unit 1052-N, and the output selection unit 1053-N form a memory controller 1055-N. Each of the memory controllers 1055-1 to 1055-N performs storage and extraction of data packets in and from the storage unit 106. Although one memory controller may suffice, if a plurality of memory controllers are provided, access to the storage unit 106 can be parallelized, and processing performance can be improved.

The data management unit 105 manages a data packet received from the packet type determination unit 103 for each user, and outputs it to the tag addition unit 107 at the subsequent stage at an appropriate timing.

The packet distribution unit 1050 decides a memory controller that controls storage of the data packet received from the packet type determination unit 103 and outputs the data packet to the user determination unit 1051 (1051-1 to 1051-N) of the decided memory controller. Note that if a part of the user ID is the number of a memory controller, the packet distribution unit 1050 can perform distribution at a high speed. In deciding the memory controller to distribute the packet, it is appropriately decided in accordance with, for example, the free state of the memory controller for processing.

The user determination units 1051-1 to 1051-N each refer to the user ID of the packet received from the packet distribution unit 1050, and decide to which of the storage unit 106 and the output selection units 1053-1 to 1053-N the packet should be transferred.

More specifically, upon receiving a packet having the same user ID as the user ID of the packet that is currently being output from a corresponding one of the output selection units 1053-1 to 1053-N belonging to the same memory controller as the user determination unit itself, each of the user determination units 1051-1 to 1051-N transfers the received packet to the corresponding one of the output selection units 1053-1 to 1053-N belonging to the same memory controller as the user determination unit itself. Also, upon receiving a packet having a user ID that is different from the user ID of the packet that is currently being output from a corresponding one of the output selection units 1053-1 to 1053-N belonging to the same memory controller as the user determination unit itself, each of the user determination units 1051-1 to 1051-N temporarily stores the received packet in the storage unit 106.

Each of the user selection units 1052-1 to 1052-N selectively extracts the data packet from the storage unit 106 based on the QoS information (information of priority) registered by the QoS control unit 110. When not performing QoS control, the user selection units 1052-1 to 1052-N each extract the data packet of the user stored first among the data packets stored in the storage unit 106.

Each of the output selection units 1053-1 to 1053-N selects which data packet received from which one of the user determination units 1051-1 and the user selection units 1052-1 to 1052-N belonging to the same memory controller as the output selection unit itself should be output. Since a back pressure can be applied to the user selection units 1052-1 to 1052-N, data packets received from the user determination units 1051-1 to 1051-N are preferentially output. The packet order may be changed by the selection. For this reason, the data processing devices 3-1 to 3-13 need to have a packet order control function.

The output control unit 1054 outputs the packets output from the output selection units 1053-1 to 1053-N to the tag addition unit 107. If there exist a plurality of memory controllers (output selection units 1053-1 to 1053-N), the output control unit 1054 controls which packet from which memory controller should be output to the tag addition unit 107. As the control method, a round robin method, a best effort method, a DiffServ method (QoS), or the like can be used.

Upon receiving a packet having a user ID that is different from the user ID of the packet that is currently being output from a corresponding one of the output selection units 1053-1 to 1053-N belonging to the same memory controller as the user determination unit itself, each of the user determination units 1051-1 to 1051-N may directly store the received packet in the storage unit 106. At this time, if a packet having the same user ID as the received packet is already stored in the storage unit 106, the user determination units 1051-1 to 1051-N may store the stored packet and the received packet in the storage unit 106 such that these are combined, thereby causing the storage unit 106 to hold larger data.

Figure 5:
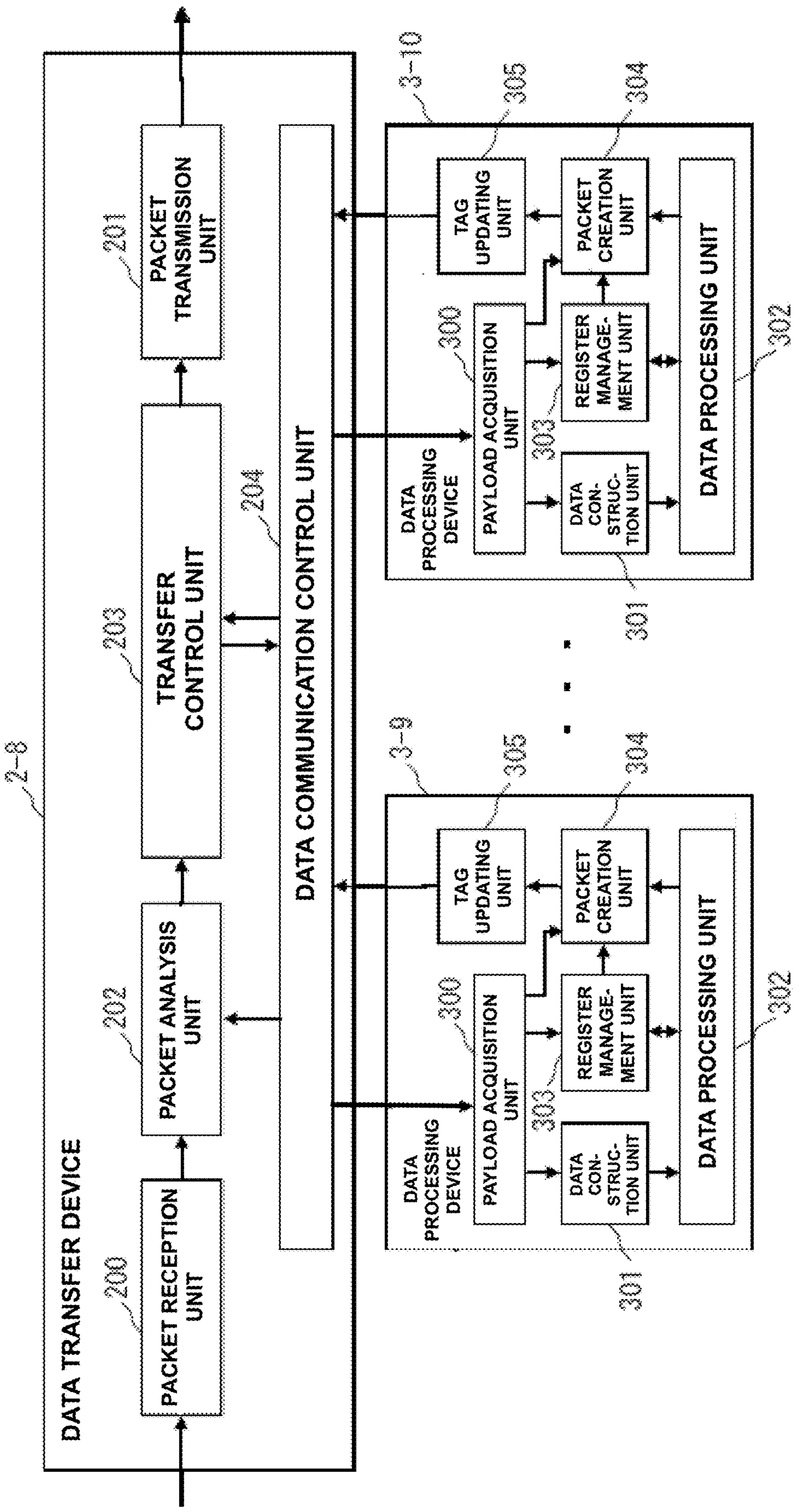
FIG. 5 is a block diagram showing the configuration of a data transfer device and data processing devices according to the embodiment of the present invention.

FIG. 5 is a block diagram showing the configuration of the data transfer device 2-8 and the data processing devices 3-9 and 3-10.

The data transfer device 2-8 is formed by a packet reception unit 200, a packet transmission unit 201, a packet analysis unit 202, a transfer control unit 203, and a data communication control unit 204.

Each of the data processing devices 3-9 and 3-10 is formed by a payload acquisition unit 300, a data construction unit 301, a data processing unit 302, a register management unit 303, a packet creation unit 304, and a tag updating unit 305.

Figure 6:
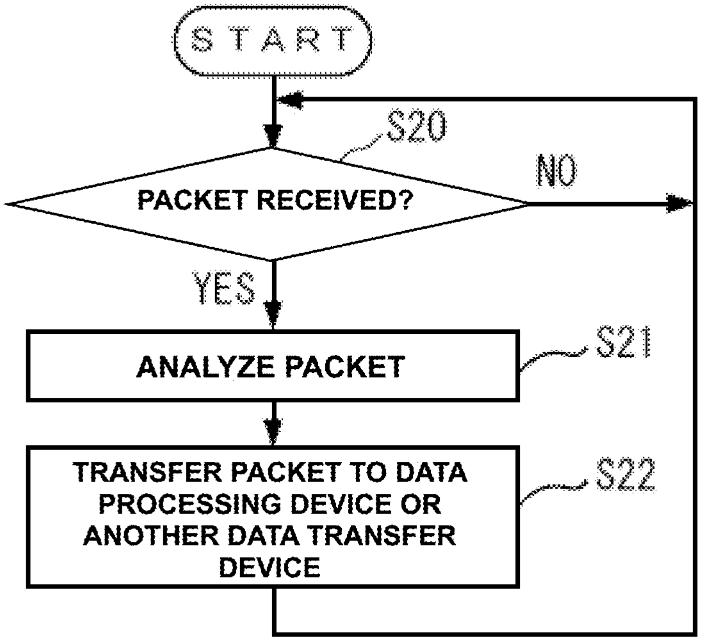
FIG. 6 is a flowchart for explaining the operation of the data transfer device according to the embodiment of the present invention.
Figure 7:
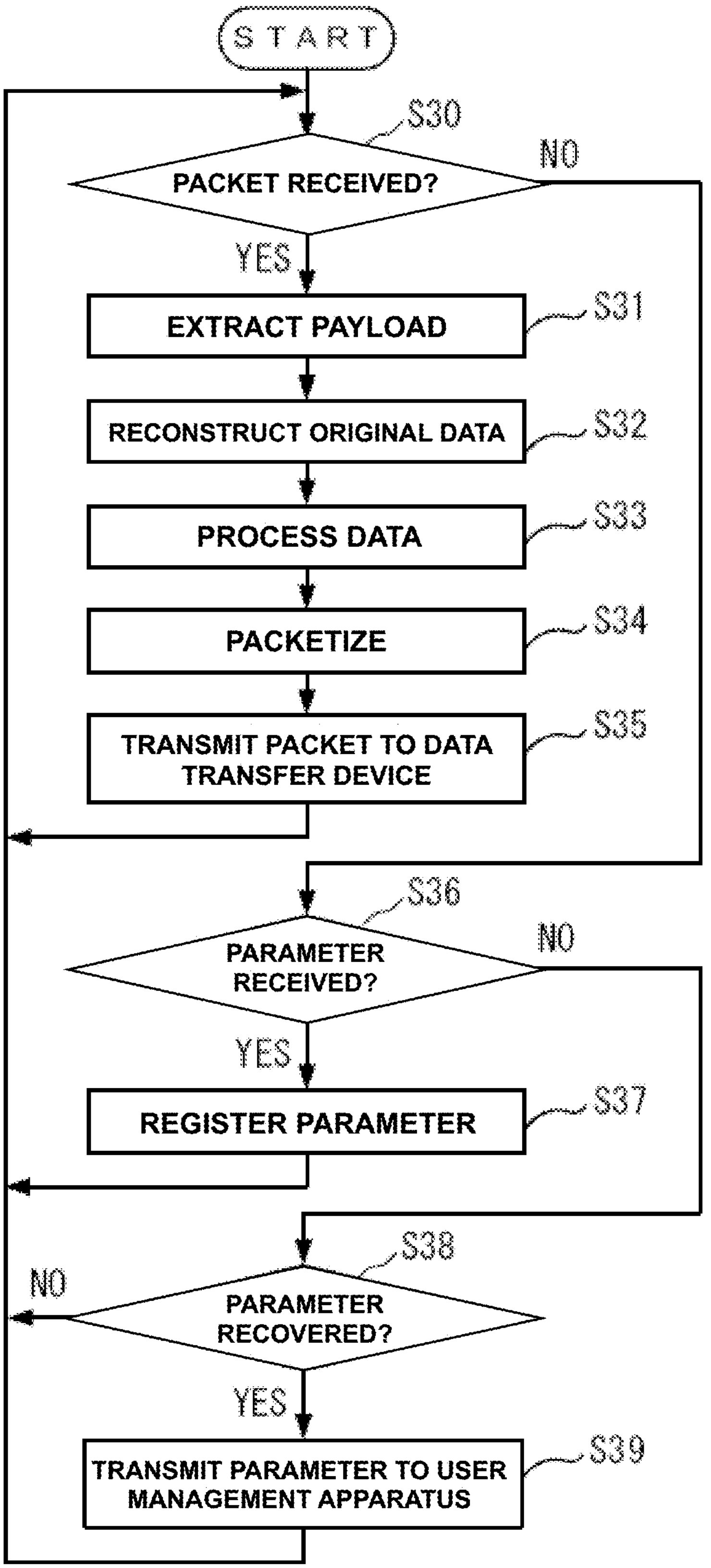
FIG. 7 is a flowchart for explaining the operation of the data processing device according to the embodiment of the present invention.

FIG. 6 is a flowchart for explaining the operation of the data transfer device 2-8, and FIG. 7 is a flowchart for explaining the operation of the data processing devices 3-9 and 3-10.

If the packet reception unit 200 of the data transfer device 2-8 receives a data packet from the user management apparatus at the preceding stage or another data transfer device (step S20 in FIG. 6), the packet analysis unit 202 analyzes the data packet, acquires the tag added to the data packet, and outputs the received data packet to the transfer control unit 203 (step S21 in FIG. 6).

Based on route information included in the tag acquired by the packet analysis unit 202 and a routing table registered in itself, the transfer control unit 203 transfers the data packet output from the packet analysis unit 202 to the data processing device 3-9 or 3-10 via the data communication control unit 204, or transfers the data packet output from the packet analysis unit 202 to an adjacent data transfer device via the packet transmission unit 201 (step S22 in FIG. 6).

The payload acquisition unit 300 of the data processing device 3-9 or 3-10 extracts a payload from the data packet received from the data transfer device 2-8 (steps S30 and S31 in FIG. 7). At this time, the payload acquisition unit 300 transfers the user ID and the tag which have been added to the received data packet to the packet creation unit 304.

The data construction unit 301 of the data processing device 3-9 or 3-10 combines payloads acquired by the payload acquisition unit 300 from a plurality of data packets, thereby reconstructing original data (step S32 in FIG. 7). Since the order of the packets that have arrived may have been changed, the data construction unit 301 performs packet order control and arranges the data extracted from the plurality of packets in a correct order. The order control is performed based on sequence numbers to be described later. If a data processable state is obtained, the data construction unit 301 transmits the reconstructed data to the data processing unit 302.

The data processing unit 302 executes predetermined processing for the data received from the data construction unit 301, and transmits the data that has undergone the processing to the packet creation unit 304 (step S33 in FIG. 7). The packet creation unit 304 packetizes the data received from the data processing unit 302, and transmits the generated packet to the tag updating unit 305 (step S34 in FIG. 7). At this time, the packet creation unit 304 adds the user ID and the tag which have been received from the payload acquisition unit 300 to the generated packet.

The tag updating unit 305 refers to the route information included in the tag added to the packet received from the packet creation unit 304, updates the route information included in the tag such that the self-device (the data processing device 3-9 or 3-10) is excluded from the route of the service chain, and transmits the packet after the updating to the data transfer device 2-8 (step S35 in FIG. 7).

The register management unit 303 performs parameter registration in the data processing unit 302 and parameter acquisition. More specifically, the register management unit 303 acquires a parameter that is unique to the user and necessary for processing in the SF from the user management apparatuses 1-1 to 1-3, as will be described later (step S36 in FIG. 7), and registers the acquired parameter in the data processing unit 302 (step S37 in FIG. 7). The parameter registration is performed for each user (for each user ID).

Also, upon receiving a recovery request packet from the user management apparatuses 1-1 to 1-3 (step S38 in FIG. 7), the register management unit 303 deletes a parameter corresponding to a user ID included in the recovery request packet from the data processing unit 302. The packet creation unit 304 of the data processing device packetizes the parameter registered in the data processing unit 302, and returns it to the user management apparatuses 1-1 to 1-3 of the request source (step S39 in FIG. 7). Thus, the parameter is managed in association with the user ID in the user management apparatuses 1-1 to 1-3. By such a parameter registration and recovery function, the parameter can be changed for each user, and data processing can be performed using a parameter suitable for the user.

Using, of the parameters registered by the register management unit 303, a parameter corresponding to the user ID acquired by the payload acquisition unit 300, the data processing unit 302 executes predetermined processing for the data received from the data construction unit 301.

The packet analysis unit 202 of the data transfer device 2-8 analyzes the packet received from the data processing device 3-9 or 3-10 via the data communication control unit 204, acquires the tag added to the packet, and outputs the received packet to the transfer control unit 203 (steps S20 and S21 in FIG. 6).

Based on route information included in the tag acquired by the packet analysis unit 202 and a routing table registered in itself, the transfer control unit 203 transfers the data packet output from the packet analysis unit 202 to the data processing device 3-9 or 3-10 via the data communication control unit 204, or transfers the data packet output from the packet analysis unit 202 to an adjacent data transfer device via the packet transmission unit 201 (step S22 in FIG. 6). At this time, since the tag is updated by the tag updating unit 305, the data processing device (SF) that has completed processing is not selected as the transfer destination.

In this way, processing in the SF is executed by the data processing device 3-9 or 3-10. If the plurality of data processing devices 3-9 and 3-10 are connected in parallel to the data transfer device 2-8, as in the example shown in FIG. 5, each of the data processing devices 3-9 and 3-10 can be accessed with little overhead. Also, if the data processing devices 3-9 and 3-10 are independent of the data transfer device 2-8, a new data processing device can be added or deleted without impeding communication between the existing data processing devices 3-9 and 3-10 and the data transfer device 2-8.

As the data processing devices 3-9 and 3-10, for example, a CPU or a GPU may be used, and processing of the data processing devices 3-9 and 3-10 may be executed by software. Alternatively, as the data processing devices 3-9 and 3-10, for example, an FPGA may be used, and processing of the data processing devices 3-9 and 3-10 may be executed by hardware. However, to implement a high-speed network, hardware is preferably used because hardware has high packet processing performance in general.

Note that in the example shown in FIGS. 5, 6, and 7, a description has been made using the data transfer device 2-8 and the data processing devices 3-9 and 3-10 as an example. The configuration and operation of the data transfer devices 2-1 to 2-7 and 2-9 are the same as the data transfer device 2-8, and the configuration and operation of the data processing devices 3-1 to 3-8 and 3-11 to 3-13 are the same as the data processing devices 3-9 and 3-10.

Figure 8:
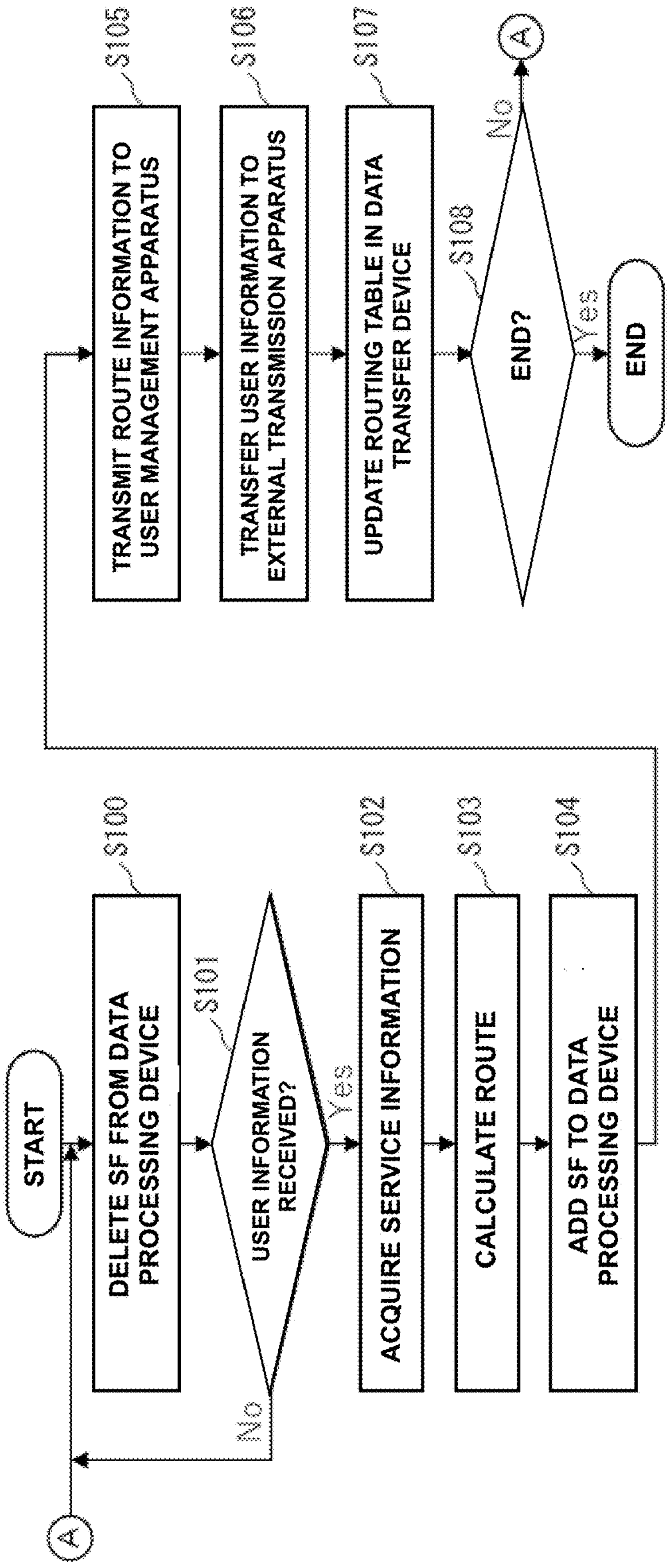
FIG. 8 is a flowchart for explaining the operation of a communication management apparatus according to the embodiment of the present invention.

FIG. 8 is a flowchart for explaining the operation of the communication management apparatus 5. The communication management apparatus 5 cooperates with the user management apparatuses 1-1 to 1-3, receives user information or service use end information, and transmits route information to the user management apparatuses 1-1 to 1-3. Also, the communication management apparatus 5 manages the routing table registered in the transfer control unit 203 of each of the data transfer devices 2-1 to 2-9, and controls addition/deletion of an SF to/from each of the data processing devices 3-1 to 3-13.

Upon receiving service use end information, the communication management apparatus 5 deletes the SF from a corresponding one of the data processing devices 3-1 to 3-13 (step S100 in FIG. 8). More specifically, if the data processing device is formed by, for example, a CPU or a GPU, the program of the SF is deleted from the memory of the CPU or the GPU. If the data processing device is formed by, for example, an FPGA, the circuit configuration of the FPGA is updated, and the circuit for the SF is deleted. By deleting the SF, power consumption of the data processing system can be reduced.

Upon receiving user information and a user ID from the user management unit 109 of the user management apparatuses 1-1 to 1-3 (YES in step S101 in FIG. 8), the communication management apparatus 5 acquires service information included in the user information (step S102 in FIG. 8).

Based on the acquired service information, the communication management apparatus 5 calculates a route passing through SFs necessary for implementing the service requested by the user (step S103 in FIG. 8). In this calculation, in consideration of the arrangement of SFs under operation, the use band between the data transfer devices 2-1 to 2-9, and the use band in the data transfer devices 2-1 to 2-9, the new service chain is prevented from affecting others. For the route calculation, for example, a layout and wiring method such as a maze method or a genetic algorithm can be used.

If there are many services under operation, it may be impossible to implement a new service using only existing SFs. Hence, in some cases, an SF is added to the data processing devices 3-1 to 3-13 under operation stop. If an SF needs to be added, the communication management apparatus 5 adds a desired SF to a data processing device under operation stop, which is located at the position of the desired SF on the route passing through SFs necessary for the new service chain (step S104 in FIG. 8).

If the data processing device is formed by, for example, a CPU or a GPU, the communication management apparatus 5 transfers the program of a predetermined SF to the data processing device and stores it in the memory of the data processing device. If the data processing device is formed by, for example, an FPGA, the communication management apparatus 5 transfers data for updating the circuit configuration of the FPGA to the data processing device and adds a circuit for the desired SF.

If route calculation succeeds, the communication management apparatus 5 transmits the route information and the user ID to a user management apparatus serving as the start point of the calculated route among the user management apparatuses 1-1 to 1-3 (step S105 in FIG. 8). If the route information is transmitted only to the user management apparatus serving as the start point of the route, the user management apparatuses 1-1 to 1-3 can each hold only route information concerning itself in association with the user ID.

In addition, the communication management apparatus 5 transfers the user information and the user ID to an external transmission apparatus serving as the end point of the calculated route among the external transmission apparatuses 4-1 to 4-3 (step S106 in FIG. 8). If the user information is transferred only to the external transmission apparatus serving as the end point of the route, the external transmission apparatuses 4-1 to 4-3 can each hold only user information concerning itself in association with the user ID.

If the user management apparatuses 1-1 to 1-3 and the external transmission apparatuses 4-1 to 4-3 of the transmission destinations accept the information sent from the communication management apparatus 5, the communication management apparatus 5 updates, based on the result of the route calculation, the routing tables registered in the transfer control units 203 of the data transfer devices 2-1 to 2-9 on the calculated route (step S107 in FIG. 8). That is, the routing tables are updated such that the packet of "service use" transmitted from the user who has requested the new service passes through the calculated route. In this embodiment, the routing table updating targets are limited to minimum data transfer devices, thereby suppressing enlargement of the routing tables.

If route calculation fails, or the user management apparatuses 1-1 to 1-3 or the external transmission apparatuses 4-1 to 4-3 of the transmission destination do not accept the information sent from the communication management apparatus 5, the communication management apparatus 5 notifies the user, via the user management apparatuses 1-1 to 1-3, that the service cannot be started.

The communication management apparatus 5 repetitively executes the above-described processing until the operation of the data processing system ends (YES in step S108 in FIG. 8).

Figure 9:
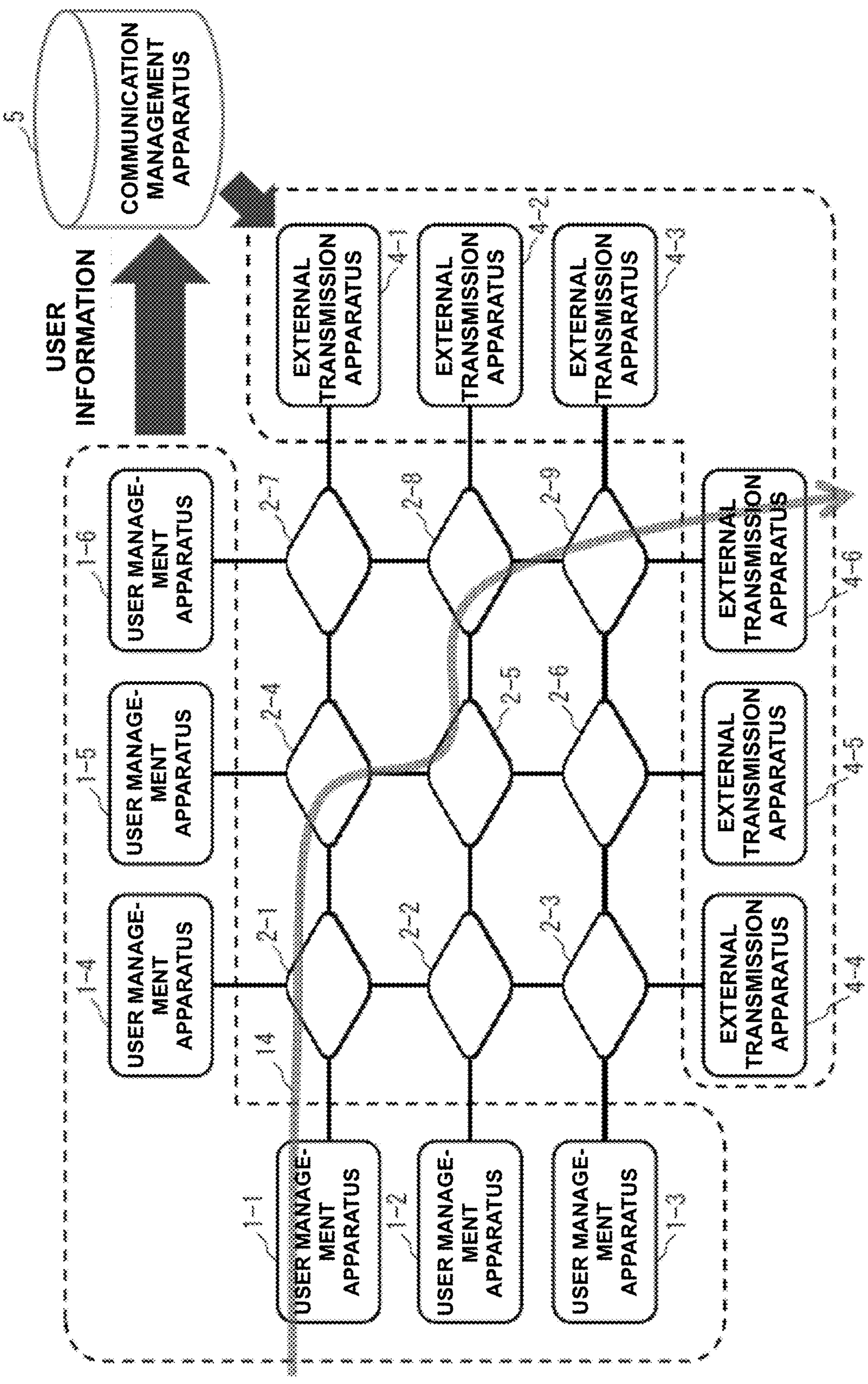
FIG. 9 is a view showing an example of a network connection form of the data processing system according to the embodiment of the present invention.

The network connection form of the data processing system according to this embodiment will be described next. As a network connection form according to this embodiment, a configuration in which specific user management apparatuses 1-1 to 1-6 or specific external transmission apparatuses 4-1 to 4-6 are connected to specific data transfer devices 2-1 to 2-9, as shown in FIG. 9, can be considered.

Figure 10:
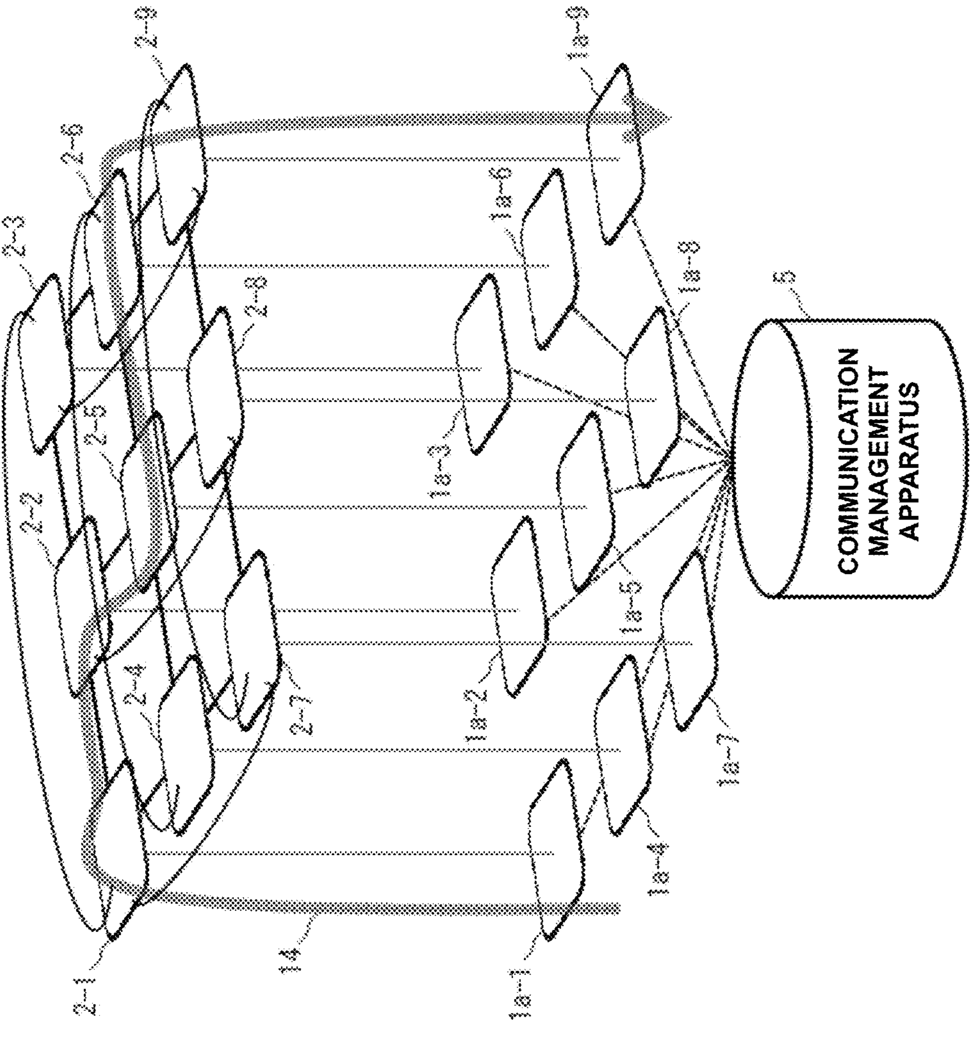
FIG. 10 is a view showing another example of the network connection form of the data processing system according to the embodiment of the present invention.

As another network connection form, a configuration in which all user management and external transmission apparatuses 1*a*-1 to 1*a*-9 are connected to all the data transfer devices 2-1 to 2-9, as shown in FIG. 10, can be considered. As is apparent from the name, the user management and external transmission apparatuses 1*a*-1 to 1*a*-9 each have the functions of both the user management apparatus and the external transmission apparatus. Note that data processing devices are not illustrated in FIGS. 9 and 10.

Intra-system communication according to this embodiment is packet communication, and the data transfer devices 2-1 to 2-9 have an arbitrary connection configuration therebetween. The connection configuration between the data transfer devices 2-1 to 2-9 can be, for example, of a bus type, a star type, a line type, a tree type, a ring type, a torus type, a mesh type, or a complex thereof.

A packet from the user can be input to an arbitrary one of the user management apparatuses 1-1 to 1-6 or an arbitrary one of the user management and external transmission apparatuses 1*a*-1 to 1*a*-9 using a load balancer 6 outside the data processing system, as shown in FIG. 1.

If the positions of the input and the output are fixed, like the configuration shown in FIG. 9, a route can easily be calculated. However, if the number of users (=the number of service chains) increases, an optimum route cannot be calculated, and service latency may degrade. It may be impossible to provide the service at worst.

To return the packet that has undergone all data processes from an arbitrary one of the external transmission apparatuses 4-1 to 4-6 or an arbitrary one of the user management and external transmission apparatuses 1*a*-1 to 1*a*-9 to the user, a method of transferring, via the communication management apparatus 5, user information (an IP address and the like) held in one of the user management apparatuses 1-1 to 1-6 (or the function unit of a user management apparatus in the user management and external transmission apparatuses 1*a*-1 to 1*a*-9) to one of the external transmission apparatuses 4-1 to 4-6 (or the function unit of an external transmission apparatus in the user management and external transmission apparatuses 1*a*-1 to 1*a*-9) can be considered.

As described with reference to FIG. 8, the communication management apparatus 5 transfers the user information to the external transmission apparatus or the user management and external transmission apparatus serving as the end point of the calculated route among the external transmission apparatuses 4-1 to 4-6 or the user management and external transmission apparatuses 1*a*-1 to 1*a*-9 (step S106).

The external transmission apparatuses 4-1 to 4-6 or the user management and external transmission apparatuses 1*a*-1 to 1*a*-9 specify the user as the destination of the packet based on the user ID added to the packet that has undergone the data processing, and returns the packet that has undergone the data processing to the user based on the user information transferred from the communication management apparatus 5.

The configuration shown in FIG. 10 in which all the user management and external transmission apparatuses 1*a*-1 to 1*a*-9 are connected to all the data transfer devices 2-1 to 2-9 is preferable because the degree of freedom of the communication path can be increased, or the data processing system is universal in the viewpoint of scalability. Since the input and the output are located close, this configuration is suitable for a data center.

As described above, the route of a service chain is calculated by the communication management apparatus 5. One communication management apparatus 5 is arranged in the domain, and the communication management apparatus 5 transmits route information to the user management apparatuses 1-1 to 1-6 in charge in the domain. By calculating the route by one communication management apparatus 5, unexpected route overlap can be avoided.

Figure 11:
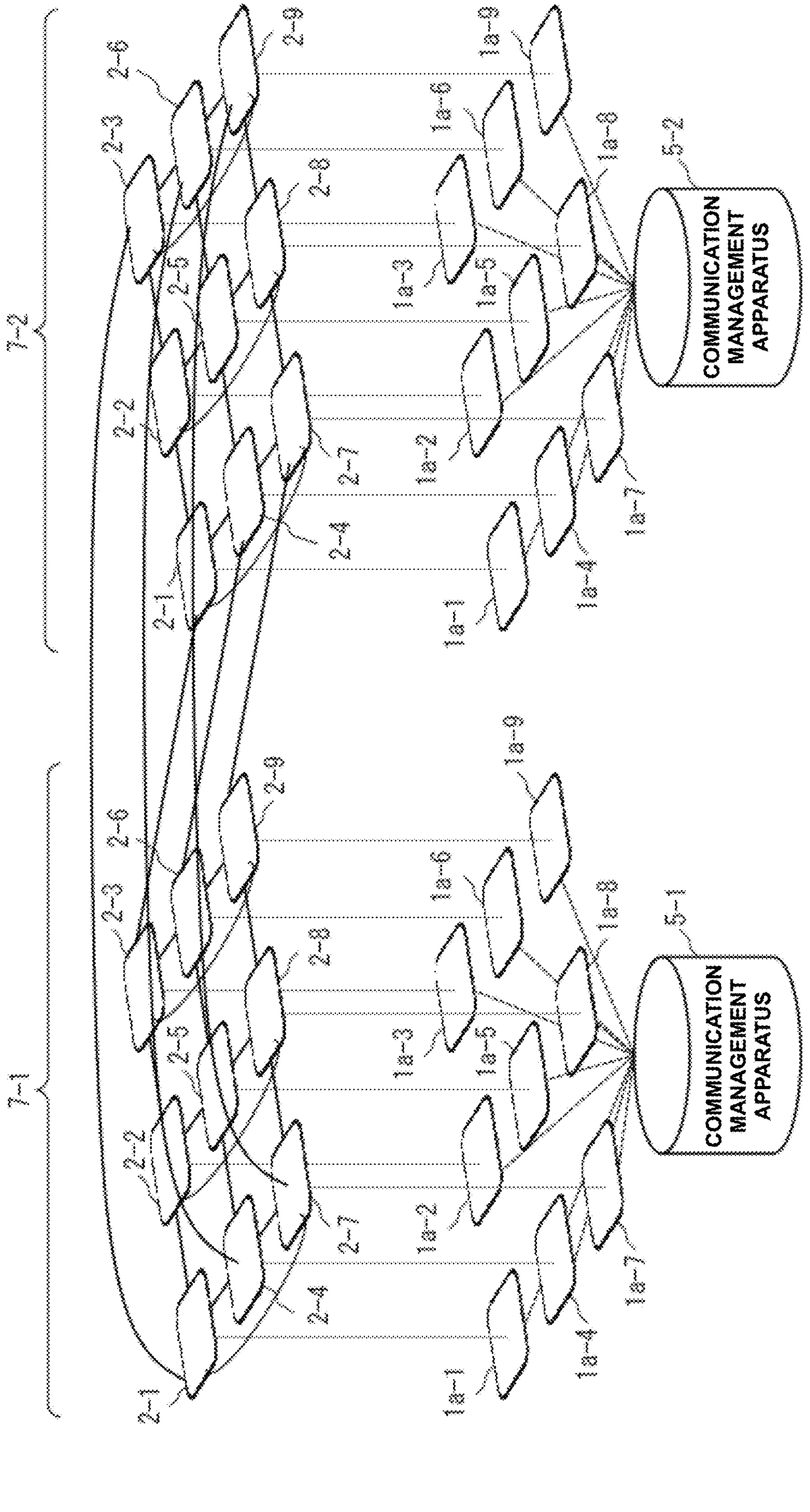
FIG. 11 is a view showing still another example of the network connection form of the data processing system according to the embodiment of the present invention.

If the system scale is large, the domain is divided into, for example, two parts, as shown in FIG. 11, and domains 7-1 and 7-2 are managed by communication management apparatuses 5-1 and 5-2, respectively. The route between the domains 7-1 and 7-2 is decided cooperatively between the adjacent communication management apparatuses 5-1 and 5-2.

Thus, in this embodiment, an appropriate route can be assigned to each service chain.

In the data processing system according to this embodiment, since the data transfer devices 2-1 to 2-9 and the data processing devices 3-1 to 3-13 are separated, a bus type network or a partial mesh type network examined in the conventional SFC can be implemented.

Figure 12:
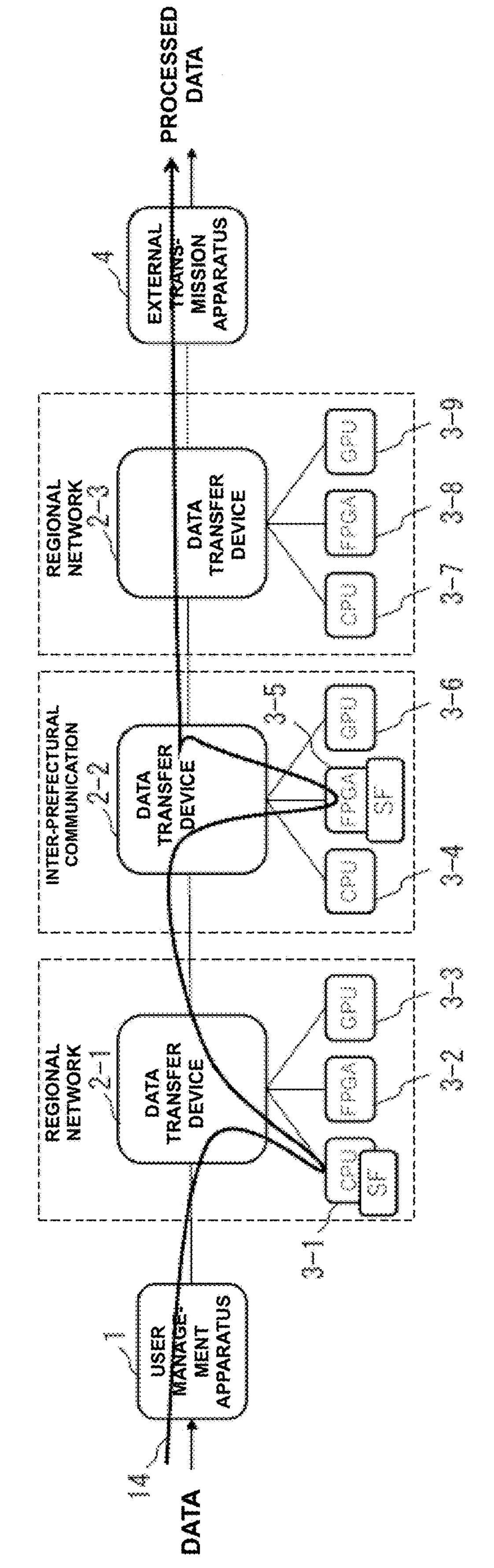
FIG. 12 is a view showing yet another example of the network connection form of the data processing system according to the embodiment of the present invention.

FIG. 12 is a view showing an example of a bus type network. In the configuration shown in FIG. 12, a user management apparatus 1, the data transfer devices 2-1 to 2-3, and an external transmission apparatus 4 are connected in series. In the bus type network, the data route is simple. On the other hand, since all service chains pass through the same data transfer devices 2-1 to 2-3, the communication band readily becomes a bottleneck.

To solve this problem, a branch point is formed in the data transfer devices 2-1 to 2-3. From the economical viewpoint, the branch point is preferably formed only at a necessary point. The bus type network is suitable for a carrier network because the input and the output are apart.

Figure 13:
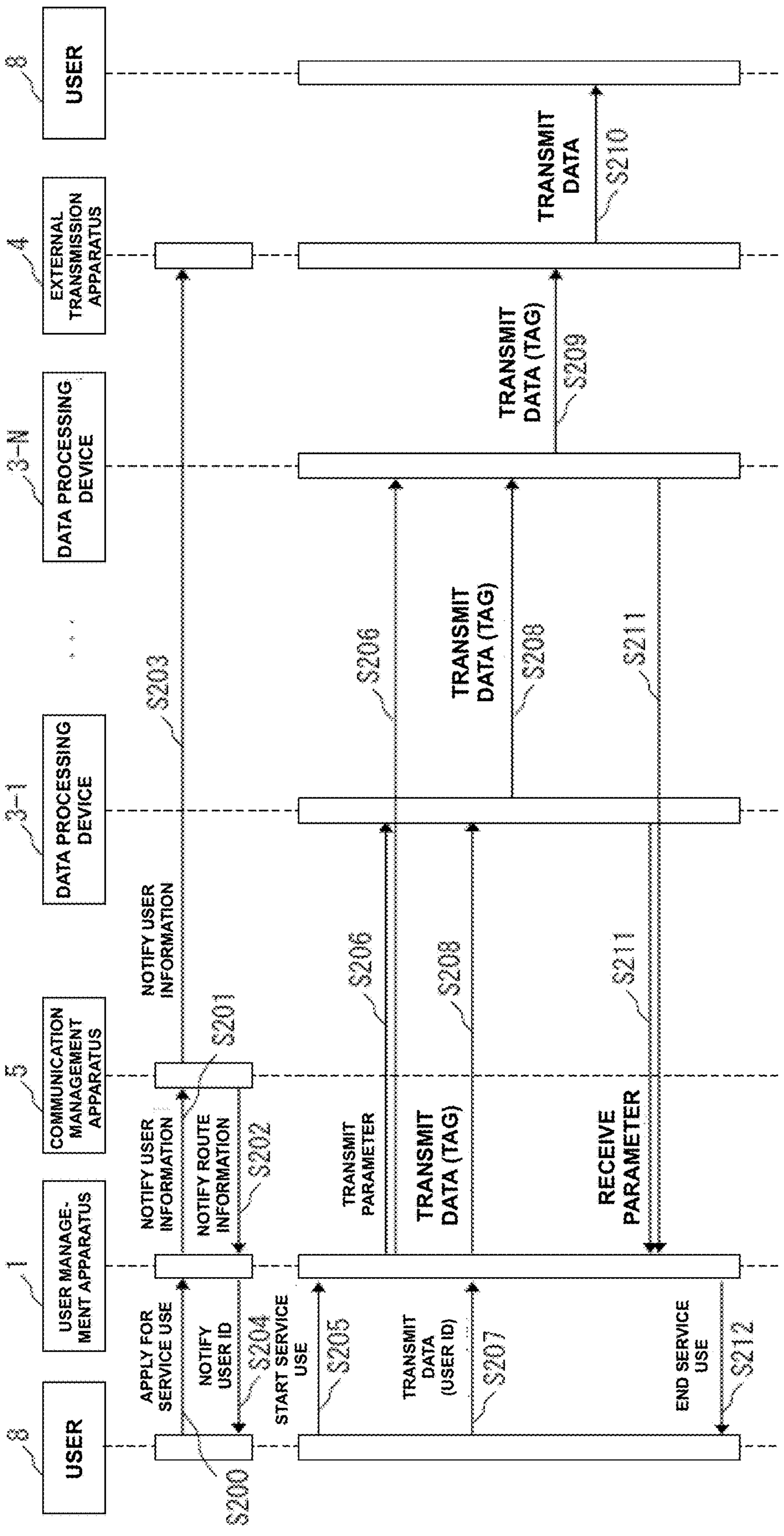
FIG. 13 is a sequence chart for explaining an operation of the data processing system according to the embodiment of the present invention.

FIG. 13 is a sequence chart for explaining an operation of the data processing system according to this embodiment. Before service use, a user who wants to use the data processing system according to this embodiment makes an application to the data processing system for service use using a user terminal 8 of himself/herself (step S200 in FIG. 13).

Upon receiving a packet whose packet type is "service use application" from the user terminal 8, the user information extraction unit 104 of the user management apparatus 1 acquires user information described in the packet. The user management unit 109 of the user management apparatus 1 issues a user ID, and transfers the user information and the user ID to the communication management apparatus 5 (step S201 in FIG. 13).

Upon receiving the user information, the communication management apparatus 5 calculates the route of the service chain based on service information included in the user information, and transmits the route information and the user ID to the user management apparatus 1 serving as the start point of the calculated route among the plurality of user management apparatuses (step S202 in FIG. 13).

Also, the communication management apparatus 5 transmits the user information and the user ID to the external transmission apparatus 4 serving as the end point of the calculated route among the plurality of external transmission apparatuses (step S203 in FIG. 13). Although not illustrated in FIG. 13, the communication management apparatus 5 updates, based on the result of route calculation, the routing table registered in the transfer control unit 203 of each data transfer device on the calculated route. Thus, the communication management apparatus 5 organizes an environment for the user to use the service.

In response to the packet of "service use application", the user management unit 109 of the user management apparatus 1 returns a packet including the issued user ID to the user terminal 8, thereby notifying the user of the user ID (step S204 in FIG. 13).

At the start of service use, the user for whom the user ID has been issued notifies the data processing system of the start of service use using the user terminal 8 of himself/herself (step S205 in FIG. 13).

Upon receiving the packet of "service use start" from the user terminal 8, the user management unit 109 of the user management apparatus 1 identifies the user based on the user ID added to the packet, and generates a user-specific parameter necessary for data processing in the SF based on the service information included in the user information managed in association with the user ID. The user management unit 109 then transmits the user-specific parameter to the data processing devices 3-1 to 3-N (SF) on the route of the service chain based on the route information managed in association with the user ID (step S206 in FIG. 13).

Although the data transfer devices are not illustrated in FIG. 13, the user-specific parameter is packetized and transmitted from the user management apparatus 1 to the closest data transfer device. Based on the result of packet analysis by the packet analysis unit 202, the transfer control unit 203 of each data transfer device transfers the packetized parameter to the data processing device connected to the self-device among the data processing devices 3-1 to 3-N (SF) of the transmission destination of the parameter.

The register management unit 303 of one of the data processing devices 3-1 to 3-N (SF), which has received the packetized parameter, registers the parameter in the data processing unit 302 in association with the user ID added to the received packet.

To use the service, the user transmits the data packet to the data processing system using the user terminal 8 of himself/herself (step S207 in FIG. 13). The user ID is added to the data packet whose packet type is "service use", which is transmitted from the user terminal 8.

The tag addition unit 107 of the user management apparatus 1 adds, to the packet, a tag corresponding to the user ID added to the packet whose packet type is "service use", which is received from the user terminal 8, and outputs the packet with the tag to the packet transmission unit 101. The packet transmission unit 101 of the user management apparatus 1 transmits the packet output from the tag addition unit 107 to the closest data transfer device.

Although the data transfer devices are not illustrated in FIG. 13, the packet analysis unit 202 of each data transfer device analyzes the received packet and acquires the tag added to the packet. The transfer control unit 203 of the data transfer device transfers the packet to the data processing device connected to the self-device among the data processing devices 3-1 to 3-N (SF) on the route of the service chain in accordance with the route information included in the tag acquired by the packet analysis unit 202 (step S208 in FIG. 13).

The data processing devices 3-1 to 3-N (SF) each receive a packet from the data transfer device connected to the self-device, and transmit the packet that has undergone processing in the SF to the data transfer device. In this way, transferring the packet to the data processing device (SF) by the data transfer device on the route of the service chain is performed a plurality of times, and the packet that has undergone all data processes is transferred by the data transfer device to the external transmission apparatus 4 serving as the end point of the service chain (step S209 in FIG. 13).

The external transmission apparatus 4 specifies the user of the destination of the packet based on the user ID added to the received packet, and deletes the tag from the packet. Then, based on the user information corresponding to the user ID, the external transmission apparatus 4 returns the packet with the destination information of TCP/IP to the user terminal 8 (step S210 in FIG. 13).

If another user uses the same SF, at the timing of switching the user, the user management unit 109 of the user management apparatus 1 transmits a packet that requests recovery of the parameter specific to the user who has ended service use to the data processing devices 3-1 to 3-N (SF) on the route of the service chain based on the route information managed in association with the user ID of the user. Based on the result of packet analysis by the packet analysis unit 202, the transfer control unit 203 of each data transfer device transfers the recovery request packet from the user management apparatus 1 to the data processing device connected to the self-device among the data processing devices 3-1 to 3-N (SF).

Upon receiving the recovery request packet from the user management apparatus 1, the register management unit 303 of the data processing device deletes, from the data processing unit 302, a parameter corresponding to the user ID included in the recovery request packet. The packet creation unit 304 of the data processing device packetizes the parameter registered in the data processing unit 302, and transmits it to the data transfer device connected to the self-device. The packetized parameter is transferred from the data transfer device to the user management apparatus 1 (step S211 in FIG. 13).

The user management unit 109 of the user management apparatus 1 manages the parameter recovered from the data processing devices 3-1 to 3-N (SF) via the data transfer device in association with the user ID of the user who has ended service use. Also, the user management apparatus 1 notifies the user terminal 8 of the end of service use (step S212 in FIG. 13). The packet indicating the end of service use is transmitted from the user management apparatus 1 to the communication management apparatus 5 as well.

The timing of determining that the system ends service use is when the user notifies that he/she stops service use or when data is not sent for a predetermined time (timeout). In any case, the user terminal 8 is notified of the end of service use. At this time, if a parameter to the user remains in the data processing devices 3-1 to 3-N (SF), it is recovered (discarded), and a parameter to the next user is transmitted.

In a case where another user is standing by even during service use of the user, after the service is used for a predetermined time, as the result of QoS control or in response to an instruction from the outside, the service is temporarily interrupted, and the data processing devices 3-1 to 3-N (SF) are released for the next user. At this time, the parameter is recovered from the data processing devices 3-1 to 3-N (SF), and the parameter for the next user is transmitted. However, the timing of release is the timing when data processing is finished. For example, in an image processing service, processing is performed on a frame basis. Hence, after transmission of data of one frame is ended, the process shifts to parameter updating processing.

Figure 14:
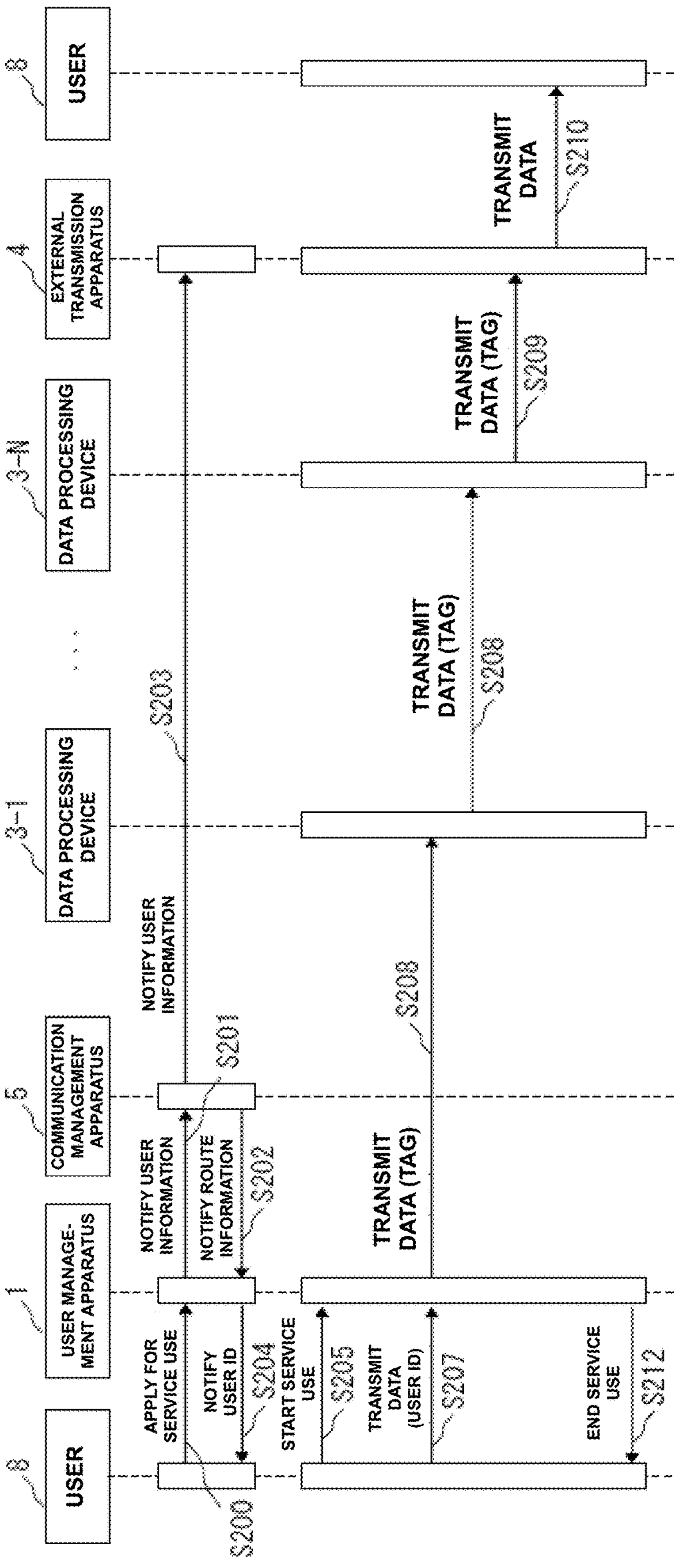
FIG. 14 is a sequence chart for explaining another operation of the data processing system according to the embodiment of the present invention.

FIG. 14 is a sequence chart for explaining another operation of the data processing system according to this embodiment. The data processing system according to this embodiment can also provide a service in which no user-specific parameter is used. If no user-specific parameter is used, the processes of steps S206 and S211 described with reference to FIG. 13 are unnecessary. The rest of the processing is the same as in FIG. 13.

An example of a service that does not use a parameter is a network service. For example, a network service such as firewall, DPI, or load balancing is assumed to be simultaneously used by a plurality of traffics, and parameter switching is unnecessary.

In a cloud service as well, for example, if the same learning data is used in machine learning, or if the same parameter is usable in image processing, parameter switching is unnecessary, and the service can be handled as a service that does not use a parameter.

The data processing system according to this embodiment can use a general IP network for communication with the user terminal 8. In this case, the data processing system uniquely identifies a user from an IP address and a port number described in a packet received from the user terminal 8, and issues a user ID.

Figure 15A:
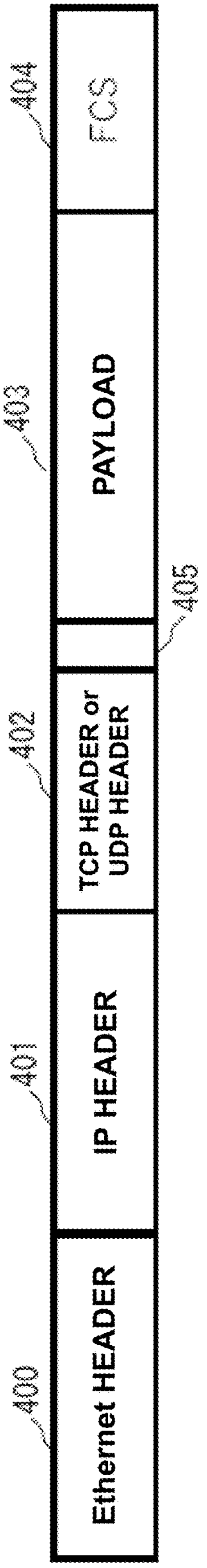
FIG. 15A is a view showing the format of a packet transmitted from a user terminal at the time of service use application.
Figure 15B:
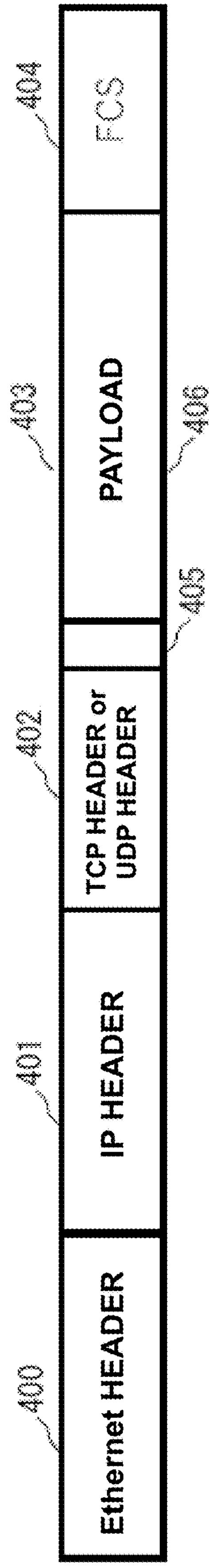
FIG. 15B is a view showing the format of a packet transmitted/received between the user terminal and the data processing system at the time of service use.
Figure 15C:
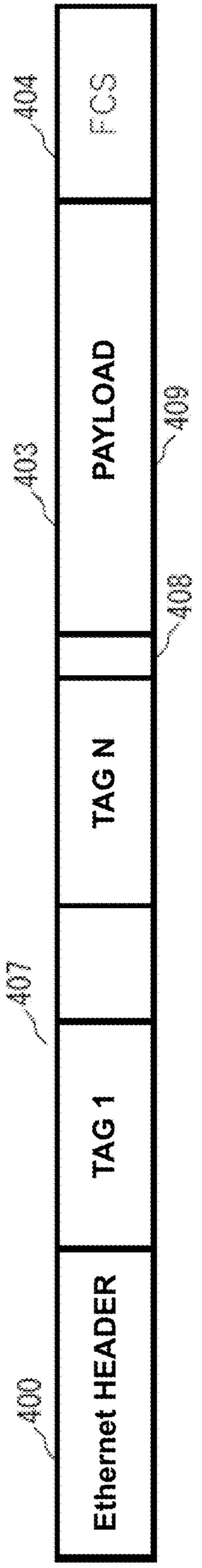
FIG. 15C is a view showing the format of a packet transmitted/received between in the data processing system at the time of service use.

FIG. 15A shows the format of a packet transmitted from the user terminal 8 at the time of service use application, FIG. 15B shows the format of a packet transmitted/received between the user terminal 8 and the data processing system at the time of service use, and FIG. 15C shows the format of a packet transmitted/received between in the data processing system at the time of service use.

The packet of "service use application" includes an Ethernet® header 400, an IP header 401, a TCP header or UDP header 402, a payload 403, and a Frame Check Sequence (FCS) 404.

At the time of service use application, the user terminal 8 stores packet type information indicating "service use application" (a portion 405 in FIG. 15A) in the payload 403 of the packet, and transmits the packet to the data processing system.

As described above, the user management unit 109 of the user management apparatus 1 uniquely identifies the user from a transmission source IP address and a transmission source port number extracted from the packet of "service use application", and issues a user ID. The user management unit 109 returns, to the user terminal 8, a packet in which the issued user ID is stored in the portion 405 in FIG. 15A.

At the time of service use, the user terminal 8 stores the user ID, a sequence number, and packet type information indicating "service use" in the portion indicated by 405 in the payload 403 of the packet shown in FIG. 15B, and stores a data start flag, data, and a data end flag in a portion indicated by 406 in the payload 403. The user terminal 8 transmits the thus generated packet of "service use" to the data processing system. The data start flag, the data end flag, and the sequence number are information necessary for reconstruing data by the data processing device (SF).

At the time of service use, in the data processing system, a packet having the format shown in FIG. 15C is transmitted/received. This packet includes the Ethernet® header 400, a tag 407, the payload 403, and the FCS 404. The user ID, the sequence number, and the packet type information are stored in a portion indicated by 408 in the payload 403, and the data start flag, data, and the data end flag are stored in a portion indicated by 409 in the payload 403. In the data processing system, packet communication using the tag 407 is performed. By describing route information up to the SF of the destination in each tag 407, the packet is transferred in accordance with the route information, and data processing is performed in the SF corresponding to the service requested by the user.

As described above, in this embodiment, data is managed for each user using the user management apparatuses 1 and 1-1 to 1-6, and control is performed to flow only data for one user per service chain. In this embodiment, it is possible to avoid collision of data in the data processing devices 3-1 to 3-13, and a plurality of users can use one data processing device (service function). Hence, lowering of service function use efficiency can be suppressed even under use by a plurality of users.

Also, in this embodiment, each of the user management apparatuses 1 and 1-1 to 1-6 is formed by the user management unit 109, the tag generation unit 111, the tag addition unit 107, the packet transmission unit 101, the QoS control unit 110, and the data management unit 105, and a tag in which route information is described is added to a packet received from a user, thereby implementing packet communication in the data processing system. Also, in this embodiment, the QoS control unit 110 is provided, thereby controlling priority of packet transfer for each user.

In this embodiment, the data management unit 105 is formed by the user selection units 1052-1 to 1052-N, the user determination units 1051-1 to 1051-N, and the output selection units 1053-1 to 1053-N, and therefore, the packet received from the user can be transferred to the tag addition unit 107 at a timing according to the priority of transfer.

In this embodiment, a plurality of memory controllers 1055-1 to 1055-N formed by the user determination units 1051-1 to 1051-N, the user selection units 1052-1 to 1052-N, and the output selection units 1053-1 to 1053-N, respectively, are provided, and therefore, access to the storage unit 106 can be parallelized, and processing performance can be improved.

In this embodiment, before service use by the user, the user management apparatuses 1 and 1-1 to 1-6 transmit a user-specific parameter necessary for processing of a service function to the data processing devices 3-1 to 3-13 on the route of the service chain based on the route information, and after the end of service use, recover the parameter from the data processing devices 3-1 to 3-13, thereby replacing the parameter for each user and performing data processing using the parameter suitable for each user.

Also, in this embodiment, if a new service function is necessary for implementing the service requested by the user, the communication management apparatuses 5, 5-1, and 5-2 add the necessary service function to the data processing devices 3-1 to 3-13 under operation stop, and after the end of service use, delete the service function from the data processing devices 3-1 to 3-13 used to implement the service, thereby appropriately performing addition and deletion of the service function.

Figure 16:
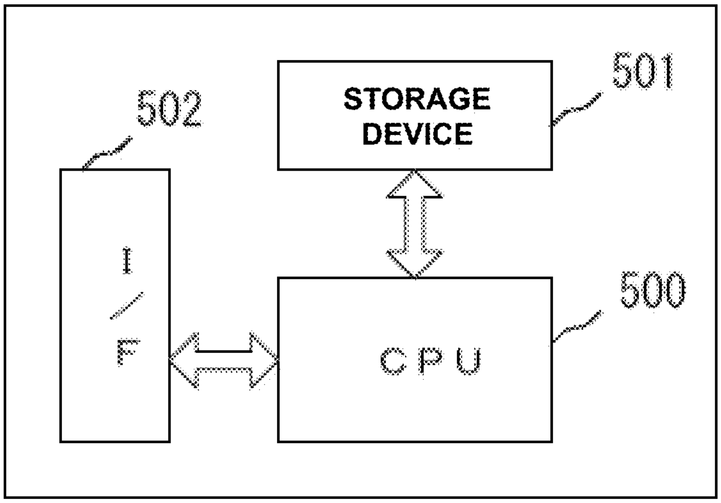
FIG. 16 is a block diagram showing an example of the configuration of a computer that implements the data processing system according to the embodiment of the present invention.

Each of the user management apparatuses 1 and 1-1 to 1-6, the user management and external transmission apparatuses 1*a*-1 to 1*a*-9, the data transfer devices 2-1 to 2-9, the data processing devices 3-1 to 3-13, the external transmission apparatuses 4, 4-1 to 4-6, the communication management apparatuses 5, 5-1, and 5-2, and the user terminal 8 described in this embodiment can be implemented by a computer including a CPU (or a GPU), a storage device, and an interface, and a program that controls these hardware resources. FIG. 16 shows an example of the configuration of the computer. The computer includes a CPU 500 (or a GPU), a storage device 501, and an interface device 502. In such a computer, a program configured to implement a data processing method according to embodiments of the present invention is stored in the storage device 501. The CPU 500 (or the GPU) of each apparatus executes processing described in this embodiment in accordance with the program stored in the storage device 501.

At least some of the user management apparatuses 1 and 1-1 to 1-6, the user management and external transmission apparatuses 1*a*-1 to 1*a*-9, the data transfer devices 2-1 to 2-9, the data processing devices 3-1 to 3-13, the external transmission apparatuses 4, 4-1 to 4-6, and the communication management apparatuses 5, 5-1, and 5-2 may be formed by an FPGA or an ASIC. In particular, if part of packet processing and data processing is executed by these pieces of hardware, processing performance can be expected to be improved.

Some or all of the above-described embodiments can also be described as in the following supplementary notes but are not limited to the followings.

(Supplementary Note 1) According to embodiments of the present invention, there is provided a data processing system comprising a user management apparatus configured to perform management of information of a user who applies for use of a service, and transfer control of a packet received from the user, a data processing device configured to perform data processing of a service function for data included in the received packet, one or a plurality of data transfer devices having one or a plurality of data processing devices under control, a communication management apparatus configured to calculate a route of a service chain necessary for implementing the service requested by the user and transmit route information to the user management apparatus, and update a routing table registered in the data transfer device on the calculated route based on a result of route calculation, and an external transmission apparatus configured to return, to the user, the packet that has undergone all data processes of the service chain, wherein the user management apparatus adds, to the packet received from the user, a tag in which the route information is described, and transmits the packet to the data transfer device, the data transfer device transfers the packet to one of the data processing devices under control and other data transfer devices based on the route information included in the tag added to the received packet and the routing table, and the data processing device returns the packet that has underdone the data processing to the data transfer device of a transmission source.

(Supplementary Note 2) In the data processing system according to Supplementary Note 1, the user management apparatus comprises a user management unit configured to manage the information of the user who applies for use of the service, issue a user ID, and notify the user of the issued user ID, a tag generation unit configured to generate the tag in which the route information received from the communication management apparatus is described, a tag addition unit configured to add the tag to the packet received from the user, a packet transmission unit configured to transmit the packet with the added tag to the data transfer device, a QoS control unit configured to decide, based on the information of the user managed by the user management unit, priority of transfer of the packet for each user, and a data management unit configured to transfer the packet received from the user to the tag addition unit at a timing according to the priority, wherein the user ID is added to the packet received from the user.

(Supplementary Note 3) The data processing system according to Supplementary Note 1 further comprises a storage unit configured to temporarily store the packet received from the user, wherein the data management unit comprises a user selection unit configured to selectively extract the packet from the storage unit based on information of the priority, a user determination unit configured to determine whether the packet received from the user has the same user ID as a user ID of a packet that is currently being output to the tag addition unit, and an output selection unit configured to selectively output, to the tag addition unit, a packet output from one of the user determination unit and the user selection unit, and the user determination unit transfers the packet received from the user to one of the storage unit and the output selection unit based on a result of determination.

(Supplementary Note 4) In the data processing system according to Supplementary Note 3, the data management unit comprises a plurality of memory controllers each formed by the user determination unit, the user selection unit, and the output selection unit, and further comprises a packet distribution unit configured to decide the memory controller that is a distribution destination of the packet received from the user and output the packet received from the user to the decided memory controller, and an output control unit configured to select, in accordance with a predetermined control method, a packet output from the output selection unit of each of the plurality of memory controllers, and output the packet to the tag addition unit.

(Supplementary Note 5) In the data processing system according to any one of Supplementary Notes 1 to 4, before service use by the user, the user management apparatus transmits a user-specific parameter necessary for processing of the service function to the data processing device on the route of the service chain based on the route information, and after an end of service use, recovers the parameter from the data processing device.

(Supplementary Note 6) In the data processing system according to any one of Supplementary Notes 1 to 5, if a new service function is necessary for implementing the service requested by the user, the communication management apparatus adds the necessary service function to the data processing device under operation stop, and after the end of service use, deletes the service function from the data processing device used to implement the service.

(Supplementary Note 7) According to embodiments of the present invention, there is provided a data processing method comprising a first step of transmitting, by a user management apparatus, information of a user who applies for use of a service to a communication management apparatus and an external transmission apparatus, a second step of calculating, by the communication management apparatus, a route of a service chain necessary for implementing the service requested by the user, based on service information included in the information of the user, and transmitting route information to the user management apparatus, and updating a routing table registered in a data transfer device on the calculated route based on a result of route calculation, a third step of adding, by the user management apparatus, a tag in which the route information is described to the packet received from the user and transmitting the packet to the data transfer device, a fourth step of transferring, by the data transfer device, the packet to one of data processing devices under control and other data transfer devices based on the route information included in the tag added to the received packet and the routing table managed by a self-device, a fifth step of performing, by the data processing device, processing of a service function for data included in the received packet and returning the packet that has underdone the data processing to the data transfer device of a transmission source, and a sixth step of returning, by the external transmission apparatus, to the user, the packet that has undergone all data processes of the service chain.

(Supplementary Note 8) The data processing method according to Supplementary Note 7 further comprises a seventh step of transmitting, before service use by the user, by the user management apparatus, a user-specific parameter necessary for processing of the service function to the data processing device on the route of the service chain based on the route information, and an eighth step of recovering, after an end of service use, by the user management apparatus, the parameter from the data processing device.

INDUSTRIAL APPLICABILITY

Embodiments of the present invention can be applied to a service function chaining technique.

EXPLANATION OF THE REFERENCE NUMERALS AND SIGNS

1, 1-1-1-6 . . . user management apparatus, 1*a*-1-1*a*-9 . . . user management and external transmission apparatus, 2-1-2-9 . . . data transfer device, 3-1-3-13 . . . data processing device, 4, 4-1-4-6 . . . external transmission apparatus, 5, 5-1, 5-2 . . . communication management apparatus, 6 . . . load balancer, 7-1, 7-2 . . . domain, 8 . . . user terminal, 100, 200 . . . packet reception unit, 101, 201 . . . packet transmission unit, 102, 202 . . . packet analysis unit, 103 . . . packet type determination unit, 104 . . . user information extraction unit, 105 . . . data management unit, 106 . . . storage unit, 107 . . . tag addition unit, 108 . . . data communication control unit, 109 . . . user management unit, 110 . . . . QoS control unit, 111 . . . tag generation unit, 203 . . . transfer control unit, 204 . . . data communication control unit, 300 . . . payload acquisition unit, 301 . . . data construction unit, 302 . . . data processing unit, 303 . . . register management unit, 304 . . . packet creation unit, 305 . . . tag updating unit, 1050 . . . packet distribution unit, 1051-1-1051-N . . . user determination unit, 1052-1-1052-N . . . user selection unit, 1053-1-1053-N . . . output selection unit, 1054 . . . output control unit, 1055-1-1055-N . . . memory controller.

The invention claimed is:

1. A data processing system comprising:

a user management apparatus including one or more processors programmed to manage information of a user requesting use of a service, and transfer control of a packet received from the user;

one or more data processing devices including one or more processors programmed to perform data processing of a service function for data included in the packet;

one or more data transfer devices including one or more processors programmed to control the one or more data processing devices under control;

a communication management apparatus including one or more processors programmed to calculate a route of a service chain for implementing the service requested by the user, transmit route information of the route to the user management apparatus, and update a routing table registered in one or more first data transfer devices among the one or more data transfer devices based on the route calculation, the one or more first data transfer devices being on the route of the service chain; and an external transmission apparatus including one or more processors programmed to return, to the user, a processed packet, the processed packet being the packet that has undergone data processes of the service chain, wherein the user management apparatus is further configured to add to the packet received from the user, a tag in which the route information is described, and transmit the packet to the one or more first data transfer devices on the route of the service chain, wherein the one or more data transfer devices are further configured to transfer the packet to the one or more data processing devices or another data transfer device on the route of the service chain based on the route information included in the tag and the routing table, and wherein the one or more data processing devices are configured to return the processed packet to a transmission source of the packet among the one or more data transfer devices, and wherein:

the user management apparatus is configured to (i) transmit, before service use by the user, a user-specific parameter for processing of the service function to the one or more first data processing devices on the route of the service chain based on the route information; and (ii) recover, after an end of service use, the user-specific parameter from the one or more first data processing devices to flow only data for one user per service chain, thereby avoiding collision of data in the data processing device, and to allow a plurality of users to use one data processing device.

2. The data processing system according to claim 1, wherein the user management apparatus comprises:

a user management circuit configured to manage the information of the user, issue a user ID, and notify the user of the user ID;

a tag generation circuit configured to generate the tag;

a tag addition circuit configured to add the tag to the packet received from the user;

a packet transmission circuit configured to transmit the packet with the tag to the one or more first data transfer devices on the route of the service chain;

a QoS controller including one or more processors programmed to decide, based on the information of the user managed by the user management circuit, priority of transfer of the packet for the user amongst packets for a plurality of users; and a data management circuit configured to transfer the packet received from the user to the tag addition circuit at a timing according to the priority, wherein the user ID is added to the packet received from the user.

3. The data processing system according to claim 2, wherein:

in response to a new service function being requested for implementing the service requested by the user, the communication management apparatus is configured to add the new service function to a data processing device, among the one or more data processing devices, under operation stop, and after the end of service use, delete the new service function from the data processing device used to implement the service.

4. The data processing system according to claim 2, further comprising a storage device including one or more processors programmed to temporarily store the packet received from the user, wherein the data management circuit comprises:

a user selection circuit configured to selectively extract the packet from the storage device based on information of the priority;

a user determination circuit configured to determine whether the packet received from the user has the same user ID as a user ID of a second packet that is currently being output to the tag addition circuit; and an output selection circuit configured to selectively output, to the tag addition circuit, a packet output from one of the user determination circuit and the user selection circuit, and the user determination circuit transfers the packet received from the user to one of the storage device and the output selection circuit based on a result of determining whether the packet received from the user has the same user ID as the user of the second packet that is currently being output to the tag addition circuit.

5. The data processing system according to claim 4, wherein:

in response to a new service function being requested for implementing the service requested by the user, the communication management apparatus is configured to add the new service function to a data processing device, among the one or more data processing devices, under operation stop, and after the end of service use, delete the new service function from the data processing device used to implement the service.

6. The data processing system according to claim 4, wherein the data management circuit comprises a plurality of memory controllers each provided by the user determination circuit, the user selection circuit, and the output selection circuit, and further comprising:

a packet distribution circuit configured to decide a memory controller that is a distribution destination of the packet received from the user and output the packet received from the user to the decided memory controller; and an output controller including one or more processors programmed to select, in accordance with a predetermined control method, a packet output from the output selection circuit of each of the plurality of memory controllers, and output the packet to the tag addition circuit.

7. The data processing system according to claim 6, wherein:

in response to a new service function being requested for implementing the service requested by the user, the communication management apparatus is configured to add the new service function to a data processing device, among the one or more data processing devices, under operation stop, and after the end of service use, delete the new service function from the data processing device used to implement the service.

8. The data processing system according to claim 1, wherein:

in response to a new service function being requested for implementing the service requested by the user, the communication management apparatus is configured to add the new service function to a data processing device, among the one or more data processing devices, under operation stop, and after the end of service use, delete the new service function from the data processing device used to implement the service.

9. The data processing system according to claim 1, wherein:

in response to a new service function being requested for implementing the service requested by the user, the communication management apparatus is configured to add the new service function to a data processing device, among the one or more data processing devices, under operation stop, and after the end of service use, delete the new service function from the data processing device used to implement the service.

10. A data processing method comprising:

transmitting, by one or more processors of a user management apparatus, information of a user applying for a service to a communication management apparatus and an external transmission apparatus;

calculating, by one or more processors of the communication management apparatus, a route of a service chain for implementing the service requested by the user, based on service information included in the information of the user, and transmitting, by the one or more processors of the communication management apparatus, route information to the user management apparatus, and updating, by the one or more processors of the communication management apparatus, a routing table managed by one or more processors of one or more first data transfer devices on the route of the service chain;

adding, by the one or more processors of the user management apparatus, a tag in which the route information is described to a packet received from the user and transmitting, by the one or more processors of the user management apparatus, the packet to the one or more first data transfer devices;

transferring, by the one or more processors of the one or more first data transfer devices, the packet to one or more first data processing devices or other data transfer devices on the route of the service chain based on the route information included in the tag and the routing table managed by a self-device;

performing, by one or more processors of the one or more first data processing devices, processing of a service function for data included in the packet to generate a processed packet, and returning, by the one or more processors of the one or more first data processing devices, the processed packet to a transmission source of the packet among the one or more first data transfer devices; and returning, by one or more processors of the external transmission apparatus, a processed packet to the user.

11. The data processing method according to claim 10, further comprising:

transmitting, before service use by the user, by the user management apparatus, a user specific parameter necessary for processing of the service function to the data processing device on the route of the service chain based on the route information; and recovering, after an end of service use, by the user management apparatus, the user-specific parameter from the first data processing device.

* * * * *